US012651279B2

(12) United States Patent
Ordentlich et al.

(10) Patent No.: US 12,651,279 B2
(45) Date of Patent: *Jun. 9, 2026

(54) METHOD AND SYSTEM FOR MATCHING QUERY TO ADS USING QUERY SUBWORD VECTORS

(71) Applicant: YAHOO AD TECH LLC, Dulles, VA (US)

(72) Inventors: Erik Ordentlich, San Jose, CA (US); Andrew Feng, Cupertino, CA (US); Milind Rao, Palo Alto, CA (US); Jun Shi, Fremont, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 518 days.

This patent is subject to a terminal disclaimer.

(21) Appl. No.: 15/893,424

(22) Filed: Feb. 9, 2018

(65) Prior Publication Data

US 2019/0251595 A1      Aug. 15, 2019

(51) Int. Cl.
*G06Q 30/0251* (2023.01)
*G06F 16/2453* (2019.01)
*G06F 16/9535* (2019.01)
*G06N 3/08* (2023.01)
*G06Q 30/0241* (2023.01)

(52) U.S. Cl.
CPC ... *G06Q 30/0256* (2013.01); *G06F 16/24542* (2019.01); *G06F 16/9535* (2019.01); *G06N 3/08* (2013.01); *G06Q 30/0277* (2013.01)

(58) Field of Classification Search
CPC .......... G06F 16/24542; G06Q 30/0256; G06Q 30/0277; G06N 3/08
See application file for complete search history.

(56) References Cited

U.S. PATENT DOCUMENTS

| | | | |
|---|---|---|---|
| 5,960,397 A | 9/1999 | Rahim | |
| 9,400,955 B2 * | 7/2016 | Garimella | .............. G06N 3/082 |
| 10,540,608 B1 | 1/2020 | Dirac et al. | |
| 2007/0214114 A1 | 9/2007 | Liu et al. | |
| 2011/0093331 A1 | 4/2011 | Metzler et al. | |
| 2015/0278200 A1 * | 10/2015 | He | ........................ G06F 40/194 |
| | | | 704/2 |
| 2016/0189204 A1 | 6/2016 | Ma et al. | |

(Continued)

OTHER PUBLICATIONS

Mihajlo Grbovic et al., Scalable Semantic Matching of Queries to Ads in Sponsored Search Advertising, SIGIR Jul. 2016, 375-384 (Year: 2016).*

(Continued)

*Primary Examiner* — E Carvalho
(74) *Attorney, Agent, or Firm* — Venable LLP

(57) ABSTRACT

The present teaching relates to identifying content that matches a query. Train data include queries, advertisement, and hyperlinks associated with query sessions. A plurality of subwords for each of the queries in the training data are identified. A query/ads model is then trained by optimizing vectors associated the plurality of subwords for each of the queries, advertisements, and hyperlinks in the training data with respect to an objective function. At least one vector associated with each of the queries is derived based on the plurality of subword vectors in the query/ads model that represent the plurality of subwords of the query.

11 Claims, 27 Drawing Sheets

(56)                    References Cited

U.S. PATENT DOCUMENTS

| | | | |
|---|---|---|---|
| 2017/0220575 | A1 | 8/2017 | Hohwald et al. |
| 2017/0262449 | A1 | 9/2017 | Venkataraman et al. |
| 2017/0286401 | A1* | 10/2017 | He ..................... G06F 16/3344 |
| 2018/0150466 | A1* | 5/2018 | Paquet .................. G06F 16/248 |
| 2018/0247226 | A1 | 8/2018 | Forman et al. |
| 2018/0330273 | A1 | 11/2018 | Hu et al. |
| 2019/0065460 | A1 | 2/2019 | Xin et al. |
| 2019/0114348 | A1 | 4/2019 | Gao et al. |
| 2020/0151395 | A1* | 5/2020 | Cao ......................... G06F 40/40 |

OTHER PUBLICATIONS

Office Action mailed May 21, 2020 in U.S. Appl. No. 15/893,321.
Office Action mailed Mar. 16, 2021 in U.S. Appl. No. 15/893,321.
Office Action mailed May 18, 2021 in U.S. Appl. No. 15/893,381.
Ordentlich et al "Network-Efficient Distributed Word2vec Training System for Large Vocabularies", CIKM'16, Oct. 24-28, 2016 .(Year: 2016).
Zhai et al "DeepIntent: Learning Attentions for Online Advertising with Recurrent Neural Networks", KDD'Aug. 13-17, 16, 2016. (Year: 2016).
Edizel et al"Deep Character-Level Click-Through Rate Prediction for Sponsored Search", ACM, 2017. (Year: 2017).
Mihajlo Grbovic, Scalable Semantic Matching of Queries to Ads in Sponsored Search Advertising, 2016 (Yean 2016).
1 Office Action mailed Sep. 14, 2020 in U.S. Appl. No. 15/893,321.
Office Action mailed Mar. 24, 2023 in U.S. Appl. No. 15/893,381.
Notice of Allowance mailed Apr. 8, 2024 in U.S. Appl. No. 15/893,381.
Office Action mailed Oct. 18, 2023 in U.S. Appl. No. 15/893,381.

* cited by examiner

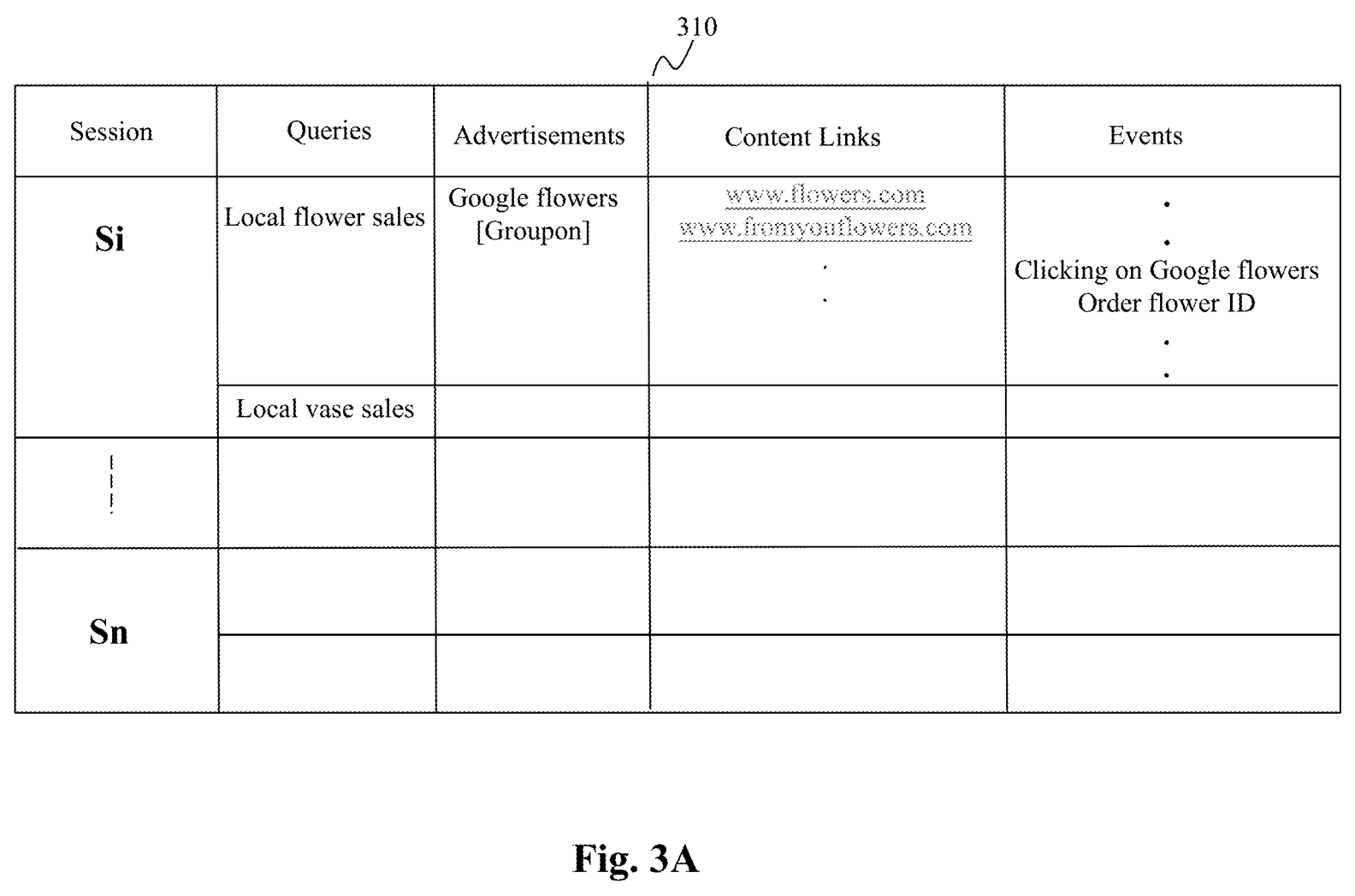

310

| Session | Queries | Advertisements | Content Links | Events |
|---------|---------|----------------|---------------|--------|
| Si | Local flower sales | Google flowers [Groupon] | www.flowers.com www.fromyouflowers.com · · | · · Clicking on Google flowers Order flower ID · · |
| --- | Local vase sales | | | |
| Sn | | | | |

Fig. 3A

440 — Receive session data

450 — Generate a model via learning based on session data

460 — Receiving a query and candidate ads

470 — Receive candidate ads for the query

480 — Obtain query/ads vectors based on the model

490 — Select a most relevant ad based on the model

660 Extract session information

665 Identify ads/links from session data

670 Identify queries from session data

675 Generate positive training data set

680 Select negative words/strings based on queries identified

685 Generate negative training data using negative ads/links

1

METHOD AND SYSTEM FOR MATCHING QUERY TO ADS USING QUERY SUBWORD VECTORS

CROSS REFERENCE TO RELATED APPLICATIONS

The present application is related to the following applications: U.S. patent application Ser. No. 15/893,321 filed on even date entitled "SYSTEM AND METHOD FOR QUERY TO AD MATCHING VIA OPTIMIZING INPUT VECTORS OF QUERY SUBWORDS" and U.S. patent application Ser. No. 15/893,381 filed on even date entitled "SYSTEM AND METHOD FOR QUERY TO AD MATCHING USING DEEP NEURAL NET BASED QUERY EMBEDDING", all of which are incorporated herein by reference in their entirety.

BACKGROUND

1. Technical Field

The present teaching generally relates to advertising. More specifically, the present teaching relates to matching queries to advertisements.

2. Technical Background

In the age of the Internet, advertising is a main source of revenue for many Internet companies. Traditionally, providers of goods/services and/or advertising agencies provide advertisements to be displayed on different platforms. One chief goal in advertising is to presenting advertisements in most relevant settings so that the financial return is maximized. This also applies to the Internet world. There are various online advertising opportunities, including an online search environment. A user types a query via, e.g., a browser or an application and content relevant to the query is identified from the Internet, either by a search engine or an application, and provided to the user, e.g., in the form of a list of hyperlinks each of which is selectable. When such relevant content is sent to the browser or an application to be displayed to the user, appropriate advertisements are often identified and sent with the relevant content so that they can be displayed to the user as well. The selection of the advertisement to be displayed to a user can be made based on the query from the user. This is called query to ads matching.

This is illustrated in FIG. 1, with respect to a query 110 entered by a user, there may be a plurality of candidate advertisements 120-1, 120-2, . . . , 120-i, 120-j, . . . , 120-n. One or more candidate advertisements may be selected for displaying to the user with content relevant to the query 110. Such advertisement(s) is selected so that the expected revenue from the selected advertisement(s) is maximized. In this illustration in FIG. 1, Ad i 120-i is selected from a plurality of candidate advertisements. Various technologies have been developed that aim to select advertisements given a search query so that the expected revenue from the selected advertisements is maximized.

Previous approaches to matching a query to an advertisement establishes a vocabulary V which includes strings representing queries, clicked advertisements, and optionally clicked hyperlinks. A learning mechanism is set up to learn from logs of session data which record queries associated with each session and events occurred in each session such as clicking an advertisement. Vectors for strings in the vocabulary V representing queries, content links, and advertisements appearing in such sessions are learned such that the affinities between queries, clicked content links, and clicked advertisements appearing near one another in the sessions are maximized. These prior approaches use queries as a whole for the training. As such, the vocabulary can be extremely large because of the exponential number of combinations of words. In addition, query as a whole provides no option for obtaining vectors for queries not encountered (sufficiently many times) in the session training data and therefore such queries are not amenable to matching to relevant advertisements through the similarity of their vector representations. Thus, a more flexible approach is needed.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for identifying content matching a query performs the following steps. Training data are first received, via the communication platform, that include queries, advertisement, and hyperlinks associated with previous query sessions. For each of the queries in the training data, a plurality of subwords are identified. A query/ads model is trained by optimizing vectors associated with the plurality of subwords of each of the queries, each of the advertisements, and each of the hyperlinks with respect to an objective function and at least one vector associated with each of the queries is derived based on a plurality of subword vectors in the query/ads model that represent a corresponding plurality of subwords identified from the query.

In a different example, a system for identifying content matching a query is disclosed, which includes a subword vector generator and a query/ads model optimization engine. The subword vector generator is configured for receiving training data comprising queries, advertisements, and hyperlinks associated with previous query sessions and identifying a plurality of subwords from each of the queries in the training data. The query/ads model optimization engine is configured for training a query/ads model by optimizing vectors associated with each of the plurality of subwords of each of the queries, each of the advertisements, and each of the hyperlinks with respect to an objective function. At least one vector associated with each of the queries is derived based on a plurality of subword vectors in the query/ads model that represent a corresponding plurality of subwords identified from the query.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for identifying content matching a query, wherein the medium, when read by the machine, causes the machine to perform a series of steps. Training data are first received, via the communication platform, that include queries, advertisement, and hyperlinks associated with previous query sessions. For each of the queries in the training data, a plurality of subwords are identified. A query/ads model is trained by optimizing vectors associated with the plurality of subwords of each of the queries, each of the advertisements, and each of the hyperlinks with respect to an objective function and at least one vector associated with each of the queries is derived based on a plurality of subword vectors in the query/ads model that represent a corresponding plurality of subwords identified from the query.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3A illustrates exemplary data log of query sessions to be used for training models for matching queries to ads;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to matching query to ads by exploiting the subword structure of a query. The subword structure may be defined by, e.g., unigram, bigram, tri-gram, etc. of words appearing the query. Prior approach for query ads matching learns vectors for entire queries treating them as single words, without concerning the subwords of the queries. In the present teaching, both vectors for subwords as well as vectors for queries are learned based on training data to improve performance. A vector for a query may be generated based on vectors of the subwords of the query. In some embodiments, a vector of a query may be generated via component-wise averaging of the vectors for its subwords. In some embodiments, a vector of a query may be generated via a CNN model. In some embodiments, a vector for a query may be generated via an RNN model. In some embodiments, a vector of a query may be generated by integrating vectors for the query using different methods.

Figure 1:
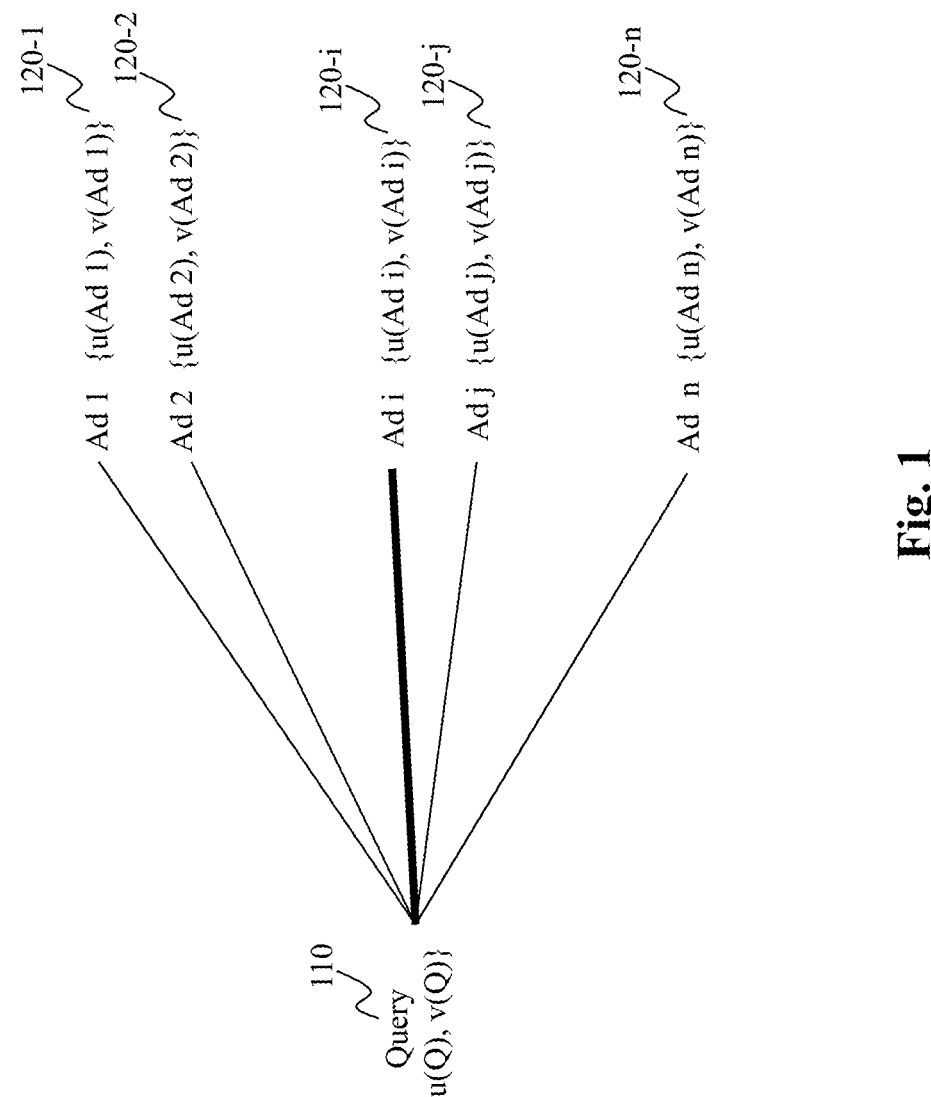
FIG. 1 depicts the problem of matching a query to one or more advertisements.
Figure 2A:
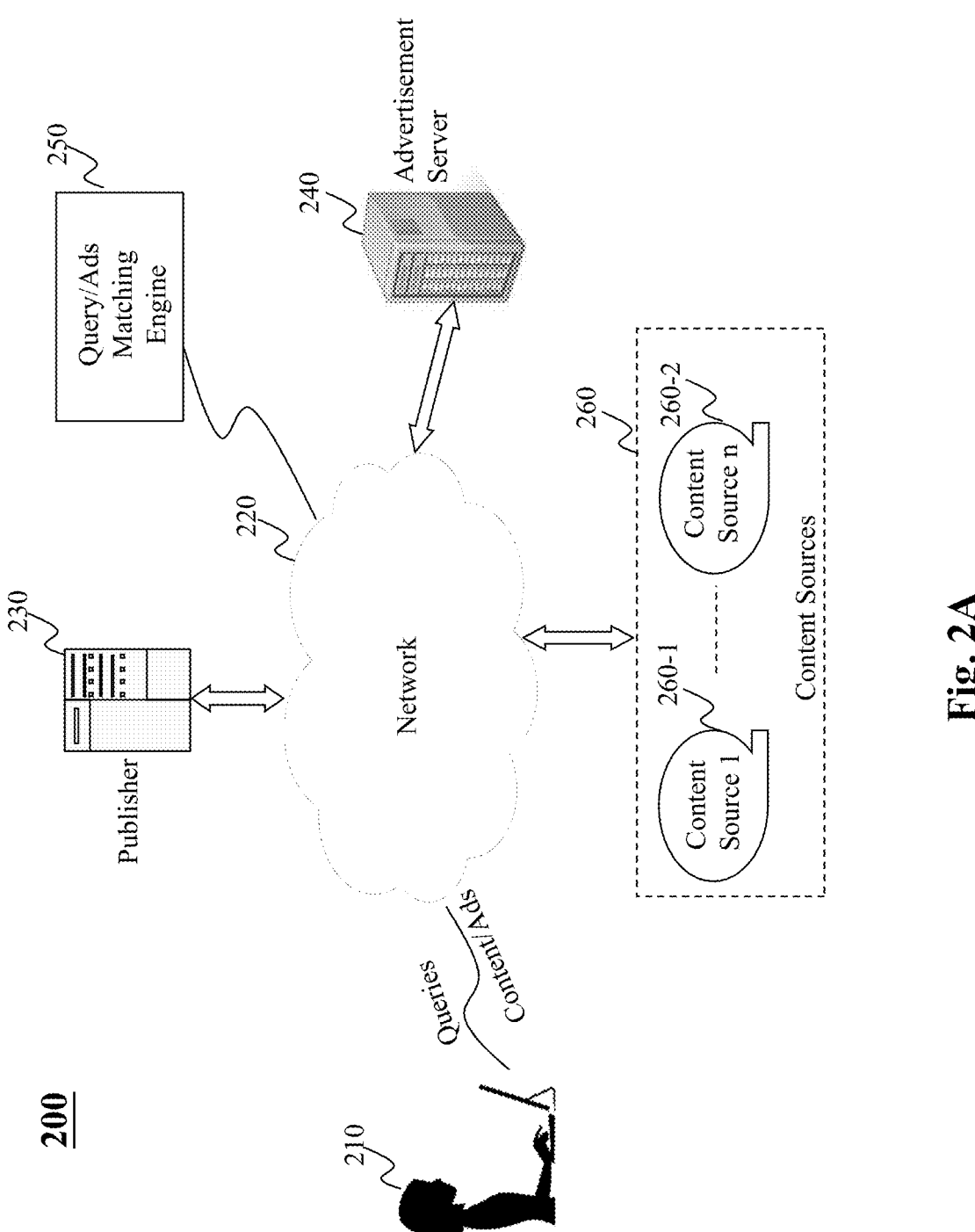
FIG. 2A-2B depict different configurations of online query to ads matching via a query/ads matching engine, according to different embodiments of the present teaching.
Figure 2B:
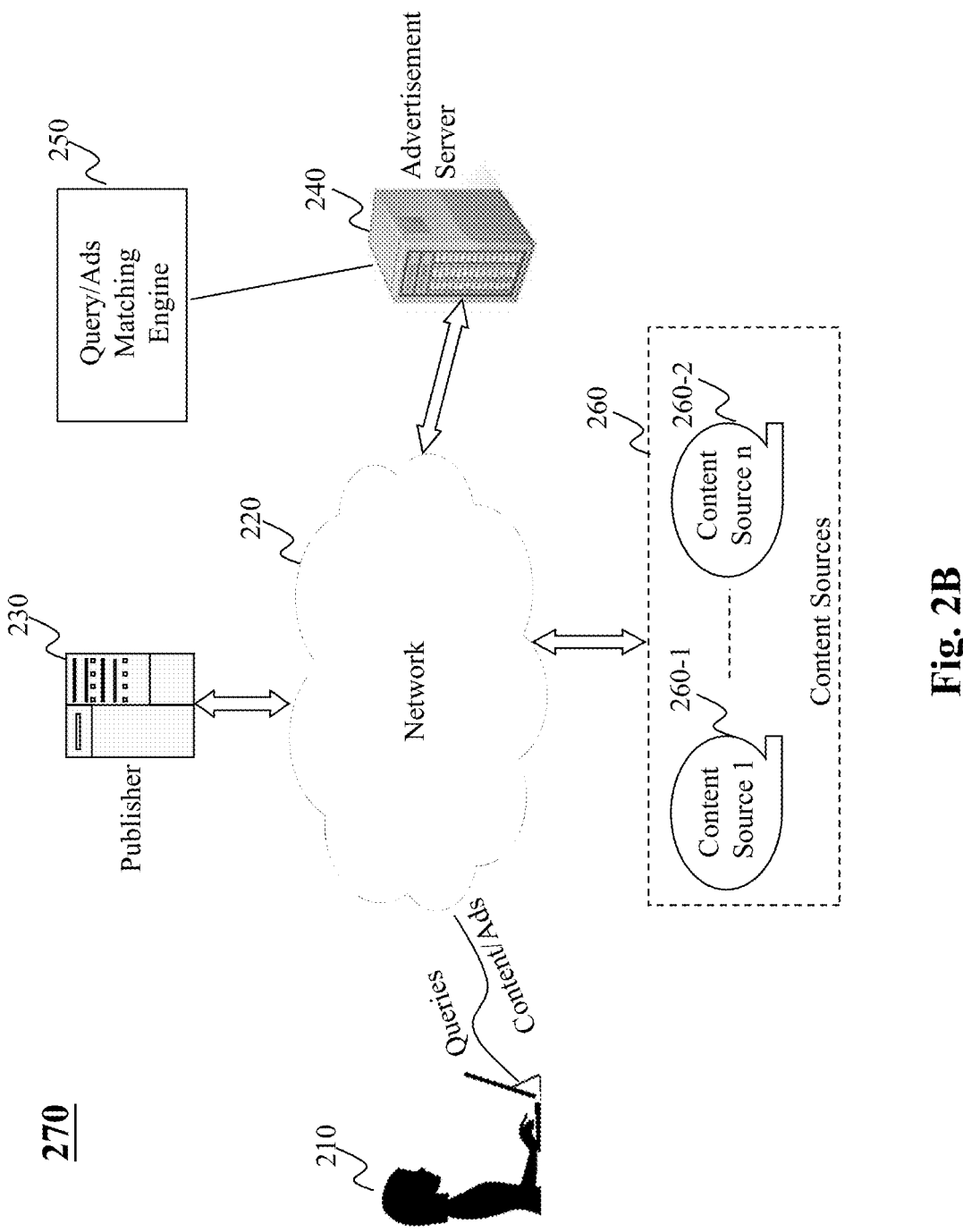

FIG. 2A-2B depict different configurations of online query to ads matching via a query/ads matching engine, according to different embodiments of the present teaching. In FIG. 2A, the exemplary system 200 includes users 210, a network 220, one or more publishers 230, content sources 260 including content source 1 260-*a*, content source 2 260-*b*, . . . , content source n 260-*c*, an advertisement server 240, and a query/ads matching engine 250. In this embodiment, the query/ads matching server 250 is connected to the network 220 an, e.g., an independent service engine. That is, it receives service requests for identifying matching advertisement(s) based on a query from the publisher 230 and candidate advertisements from the advertisement server 250 received via the network 220, determines advertisement(s) matching the query based on a trained model, and returns the matching result via the network 220 to publisher 230. In this embodiment, as the query/ads matching engine 250 is a stand-alone service, it may provide matching services to a plurality of publishers 230 and a plurality of advertisement servers 240. In FIG. 2B, an alternative configuration is provided, in which the query/ads matching engine 250 is connected to an advertisement server 240 as a backend engine. That is, in this embodiment, the query/ads matching 250 is a special module in the backend of an advertisement server 240. When there are multiple advertisement servers, each may have its own backend module for selecting a matching advertisement with respect to a request from a publisher 230.

In FIG. 2A-2B, the network 220 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points (not shown) through which a data source may connect to the network 120 in order to transmit information via the network and a network node may connect to the network 220 in order to receive information. In one embodiment, the network 220 may be an online advertising network or an ad network, which connects query/ads matching engine 250 to publisher 230 or websites/mobile applications that desire to host or receive advertisements. Functions of an ad network include an aggregation of ad-space supply from publisher 230, ad supply from the advertisement server 240, and matched advertisements that match with queries from users, the ad-space and/or content surrounding the ad-space. An ad network may be a television ad network, a print ad network, an online (Internet) ad network, or a mobile ad network.

The publisher 230 can be a content provider, a search engine, a content portal, or any other sources from which content can be obtained. The publisher 230 may correspond to an entity, whether an individual, a firm, or an organization, publishing or supplying content, including a blogger, television station, a newspaper issuer, a web page host, a content portal, an online service provider, or a game server. For example, in connection to an online or mobile ad network, publisher 230 may also be an organization such as USPTO.gov and CNN.com, or a content portal such as YouTube and Yahoo.com, or a content-soliciting/feeding source such as Twitter, Facebook, or blogs. In one example, content sent to a user may be generated or formatted by the publisher 230 based on data provided by or retrieved from the content sources 260.

The content sources 260 may correspond to online content/app generators, whether corresponding to an individual, a business entity, or a content collection agency such as Twitter, Facebook, or blogs, or any source of online content such as online news, published papers, blogs, on-line tabloids, magazines, audio content, image content, and video content. It may also be a content portal presenting content originated from an original content generator, e.g., Yahoo! Finance, Yahoo! Sports, AOL, and ESPN. The content from content sources 260 include multi-media content or text or any other form of content comprised of website content, social media content, such as Facebook, Twitter, Reddit, etc., or any other content originator. It may be licensed content from providers such as AP and Reuters. It may also be content crawled and indexed from various sources on the Internet. Content sources 260 provide a vast array of content searchable by the publisher 230 and/or other parts of system 200.

Users 210 may be of different types such as users connected to the network via desktop connections, users connecting to the network 220 via wireless connections such as through a laptop, a handheld device, or a built-in device in a mobile vehicle such as a motor vehicle. In one embodiment, users 210 may be connected to the network 220 and able to access and interact with online content with ads (provided by the publisher 230), via wired or wireless means, through related operating systems and/or interfaces implemented within user-wearable devices (e.g., glasses, wrist watch, etc.).

A request for an advertisement from the publisher 230 is received by the advertisement server 250, which may be centralized or distributed, archives data related to a plurality of advertisements. The advertisement server 240 stores and operates to distribute advertisements to appropriate ad placement opportunities on different platforms. The advertisements stored on the advertisement server 240 may include some textual information, e.g., a description of what the advertisement is about as well as additional information such as target audience of the advertisement or information related to some distribution criteria. Target audience may be specified in terms of, e.g., demographics of the target audience, geographical locations of the target audience, and/or time frame(s) the advertisement is to be distributed to the target audience. When a request is received from the publisher 230 for an advertisement, the advertisement server 250 may identify appropriate candidate advertisements for the placement. As disclosed herein, advertisements from the advertisement server 240 are to be filtered or selected via the query/ad matching engine 250 to enhance the relevance between the query and the selected advertisement(s).

In operation, a user may send a search query for online content to the publisher 230 and receive searched content as well as one or more advertisements (selected by the query/ads matching engine 240) via the network 220. The online content and advertisements may be provided and rendered on the user device. A user may then interact with the rendered content and/or advertisements by, e.g., clicking, dwelling, hovering over the content, clicking on an advertisement, etc. User interactions with content and advertisements may reflect the user's preferences with respect to the content/advertisements displayed. For example, a user may click on an advertisement displayed which may ultimately lead to a click through or conversion, i.e., a purchase made on the product/service advertised. As another example, the dwell time that the user spent on a display advertisement (e.g., detected by computing the length of time during which the cursor dwells on the advertisement) may also indicate that the user is interested in the product or service of the advertisement. In the context of the present teaching, such user interactions in a session may be observed and logged. Other peripheral information related to such interaction events may also be recorded, e.g., the time of the event, etc. The logged session data may provide useful information as to what are relevant and may be subsequently explored to enhance the performance of the query/ads matching engine 250.

FIG. 3A provide exemplary session data 310 collected from actual query sessions. The data may be organized according to sessions, each of which may involve multiple queries, content links presented, advertisement displayed, as well as interaction events which may be arranged in a chronological order with, e.g., additional peripheral information associated with such events. A simplified recorded session data example is shown in FIG. 3A. For a session i, there may be multiple queries involved, e.g., "local flower sales" and "local vase sales." For each query, there may be associated with content links representing a search result with a list of websites that are considered to be related to the query, e.g., www.flowers.com and www.fromyouflowers-.com. In addition, for each query, there may be one or more advertisements displayed on the same page as the search result. In this example, there illustrated two advertisements, one is Google flowers and one is Groupon. In other embodiments, the session data 310 may record only the selected advertisement without the advertisements displayed yet not clicked. In this example, as Groupon is not selected, it may optionally not be recorded in the session data 310.

The session data also record events that occurred in the session. For each query, user interactions with either the content links or the advertisement are recorded, e.g., in the order of the sequence of events as they occurred and optionally with other useful meta information. Such interactions include clicking on a content link or an advertisement, dwelling on certain content/advertisement, etc. Most relevant here is the data recorded in session data directed to clicked advertisement(s) and clicked content link(s). For example, in FIG. 3A, corresponding to query "local flower sales," an exemplary event of clicking on one of the advertisements displayed (Google.flowers) is recorded. As also seen in FIG. 3A, a subsequent selection of which flower was ordered (flower ID) on website Google.flowers is also recorded. More details are provided below on how such data are used to enhance the performance of the query/ads matching engine 240.

In an online session in which a user 210 queries online content, the searched online content may be presented and rendered on a user device with one or more advertisements. The number of advertisements may depend on the number of ad-space present in the online content. For each ad-space, the publisher 230 requests an advertisement from the query/ad matching engine 240 and the advertisement selected by the query/ad matching engine 240 is then provided and rendered in the ad-space intended.

Figure 3B:
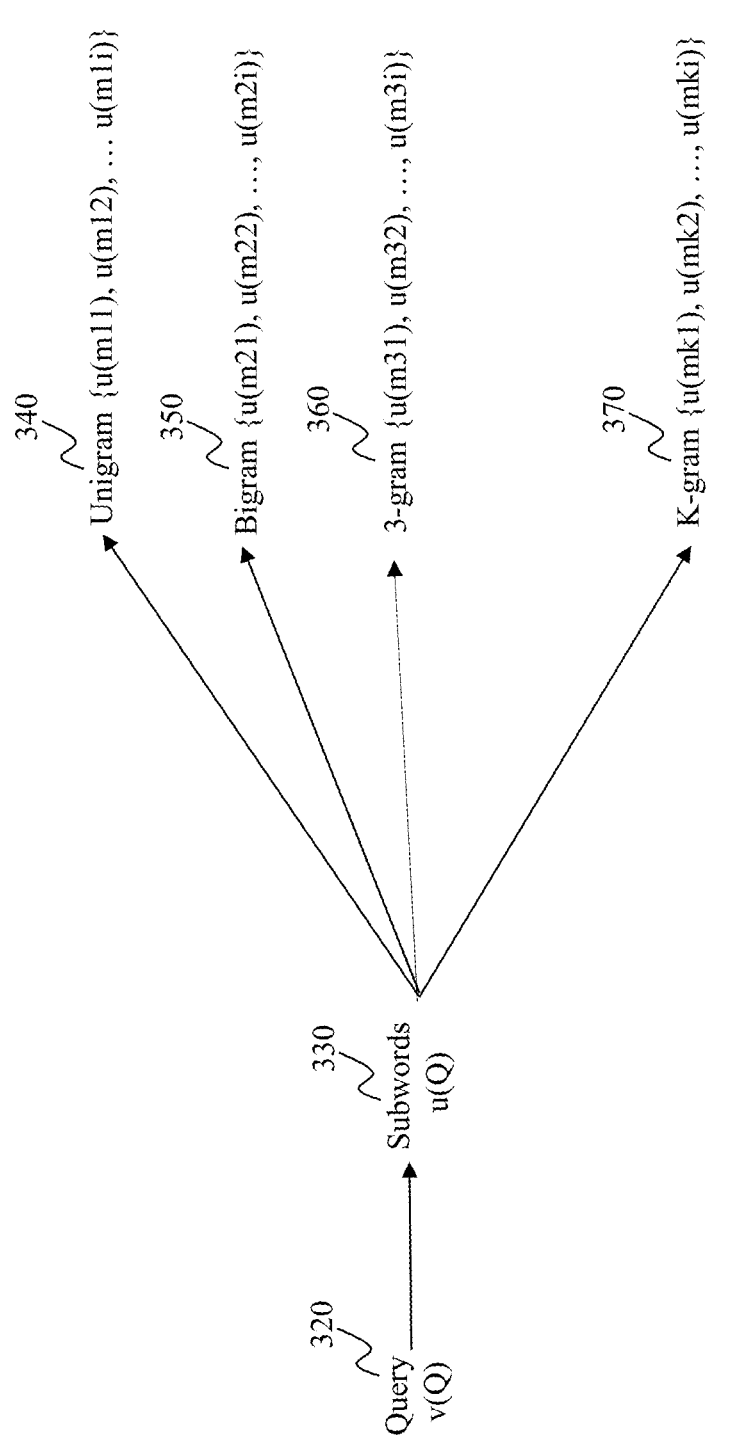
FIG. 3B depicts one aspect of the present teaching to use subword vectors to derive a model for matching query to ad, according to an embodiment of the present teaching.

As discussed herein, prior approaches use, for each query, vectors for the query as a whole in matching the query with vectors for advertisements, while the present teaching additionally uses, for each query, vectors for subwords of the query in matching the query with vectors of advertisements. FIG. 3B illustrates vectors of both queries and vectors for the subwords of the queries. For a query Qi 320, a v vector v(Qi) for the query is used. Subwords 330 of the query are identified, which can be any of or combinations of unigrams 340, bigrams 350, tri-grams 360, . . . , k-grams 370 of words appearing in the query. For each type of subword, a u vector for each subword is also used in matching the query to an advertisement. For example, if there are m1i unigrams 340, a group of vectors directed to unigrams are used, i.e., {u(m11), u(m12), . . . , u(m1i)}. Similarly, for bigrams, a group of vectors for bigrams are used, i.e., {u(m21), u(m22), . . . , u(m2i)}, etc. This differs from the conventional approaches where only u and v vectors for queries are used. Based on vectors for the subwords, a vector for the query that gives rise to the subwords may be obtained by combining the subword vectors for the subwords, i.e., $u(Q)=combiner(u(m_i), i=1, 2, . . . , k)$, where Q denotes a query. Details about the combiner are discussed with reference to FIGS. 10A-11B.

Figure 4A:
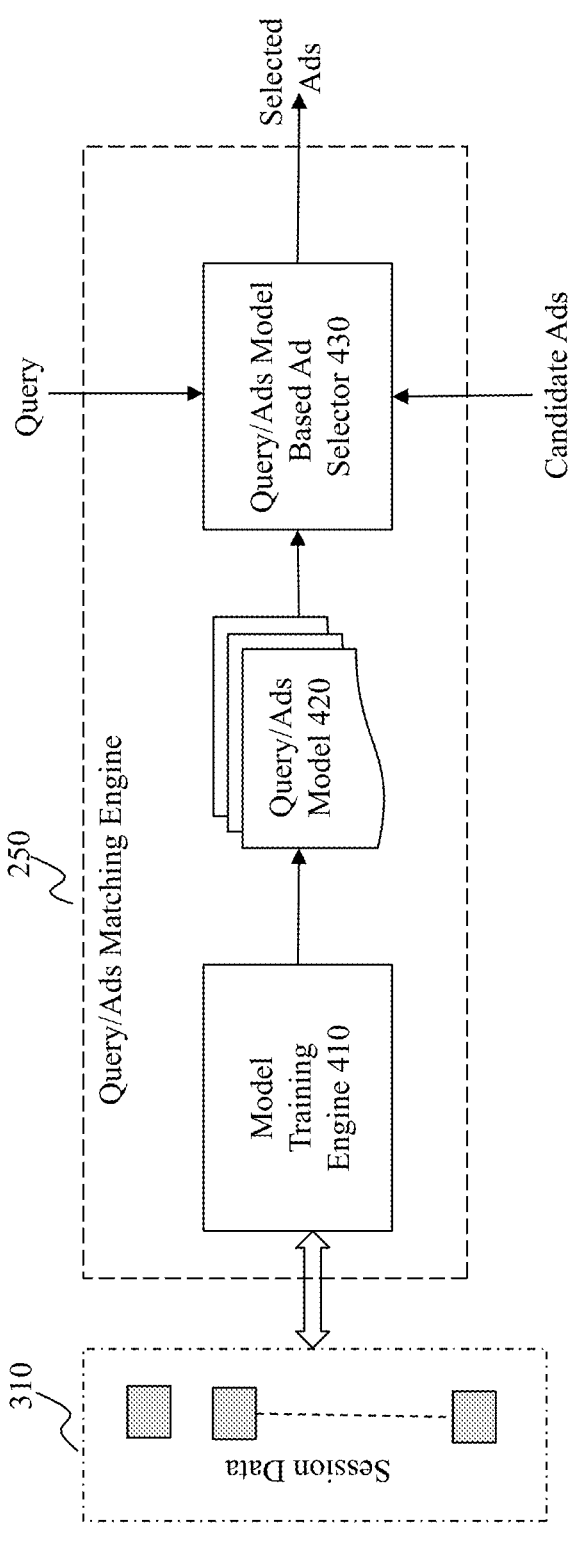
FIG. 4A depicts an exemplary high level system diagram for a query/ads matching engine, according to an embodiment of the present teaching.
Figure 4B:
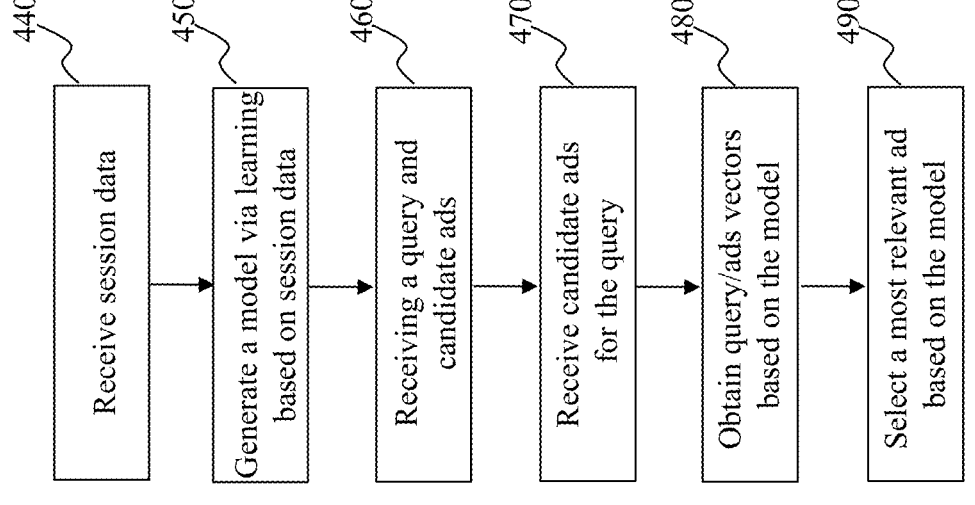
FIG. 4B is a flowchart of an exemplary process of a query/ads matching engine, according to an embodiment of the present teaching.

FIG. 4A depicts an exemplary high level system diagram for the query/ads matching engine 250, according to an embodiment of the present teaching. In this illustrated embodiment, the query/ads matching engine 250 comprises a model training engine 410, which takes the session data 310 as input and generates an optimized query/ads model 420 as output, and a query/ads model based ad selector 430, which takes a query and a set of candidate ads as input and selects an advertisement as a matching ad to the query based on the optimized query/ads model 420. FIG. 4B is a flow-chart of an exemplary process of the query/ads matching engine, according to an embodiment of the present teaching. In accordance with this exemplary embodiment, the query/ads matching engine 250 operates as follows. The model training engine 410 receives, at 440, session data as training data and learns from the session data to generate, at 450, the query/ads model 420. As will be discussed below, the query/ads model 420 involves various parameters and such parameters are optimized via learning (from the session data 310). Such parameters include vectors for subwords of queries, vectors for words from advertisements, vectors for hyperlinks related to content that is searched based on the queries, and optionally various parameters used to combine vectors for subwords to generate vectors for queries. Details will be provided with reference to FIGS. 7-13B.

Once the query/ads model 420 is optimized, the query/ads matching engine 250 proceeds to use the optimized query/ads model 420 in real time to identify an appropriate advertisement for a query from a user. With respect to a query received at 460, the query/ads model based ad selector 430 receives, at 470, a set of candidate ads. For the query and the candidate ads, corresponding vectors for subwords of the query, the query, and the candidate ads are obtained at 480 based on the query/ads model 420. Based on the obtained vectors, the query/ads model based ad selector 430 selects, at 490, a most relevant ad from the candidate ads based on the query/ads model 420. Details about the model training engine 410 and the query/ads model based ad selector 430 are provided below.

Figure 5A:
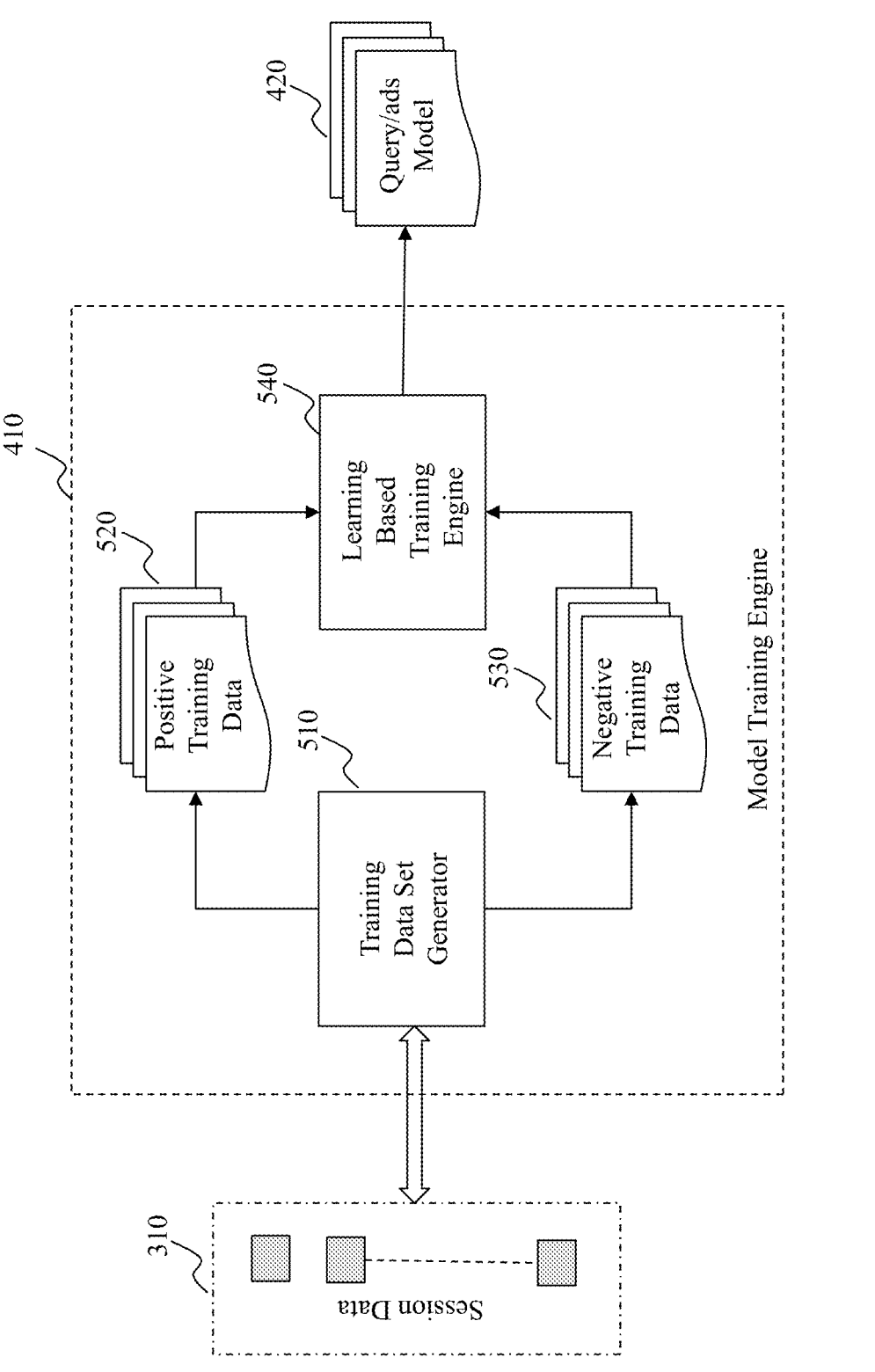
FIG. 5A depicts an exemplary high level system diagram of a model training engine, according to an embodiment of the present teaching.

FIG. 5A depicts an exemplary high level system diagram of the model training engine 410, according to an embodiment of the present teaching. In this illustrated embodiment, the model training engine 410 comprises a training data set generator 510 and a learning based training engine 540. To facilitate the training, the training data set generator 510 takes the session data 310 as input and generates two data sets as training data, one corresponding to a positive training data set 520 and the other a negative training data set 530. The positive training data set 520 includes pairs of words representing user events that appear close to one another in the temporally ordered session data. For example, the positive training data may include a word corresponding to a query and a word corresponding to a clicked advertisement. It may also include a pair corresponding to a query and another query that appeared either before or after the first query but within a certain number of user events of that query. The negative training data set 530 includes pairs of words representing user events that do not necessarily appear near one another such as where the second word of the pair is randomly selected (will be disclosed below). The positive and negative training data sets 520 and 530 are then used by the learning based training engine 540 to train the query/ads model 420. Details of the training data set generator 510 and the learning based training engine 540 are discussed with reference to FIGS. 6A-13B.

Figure 5B:
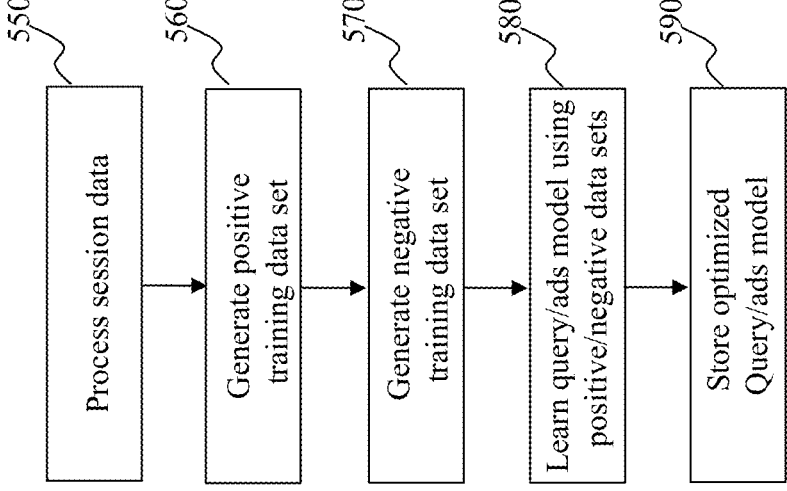
FIG. 5B is a flowchart of an exemplary process of a model training engine, according to an embodiment of the present teaching.

FIG. 5B is a flowchart of an exemplary process of the model training engine 410, according to an embodiment of the present teaching. At 550, session data 310 are first processed. Positive and negative training data sets are then generated at 560 and 570, respectively, based on the session data. The generated positive and negative training data sets are then used by the learning based training engine 540 to learn, at 580, the query/ads model 420 and the optimized query/ads model is then stored at 590.

Figure 6A:
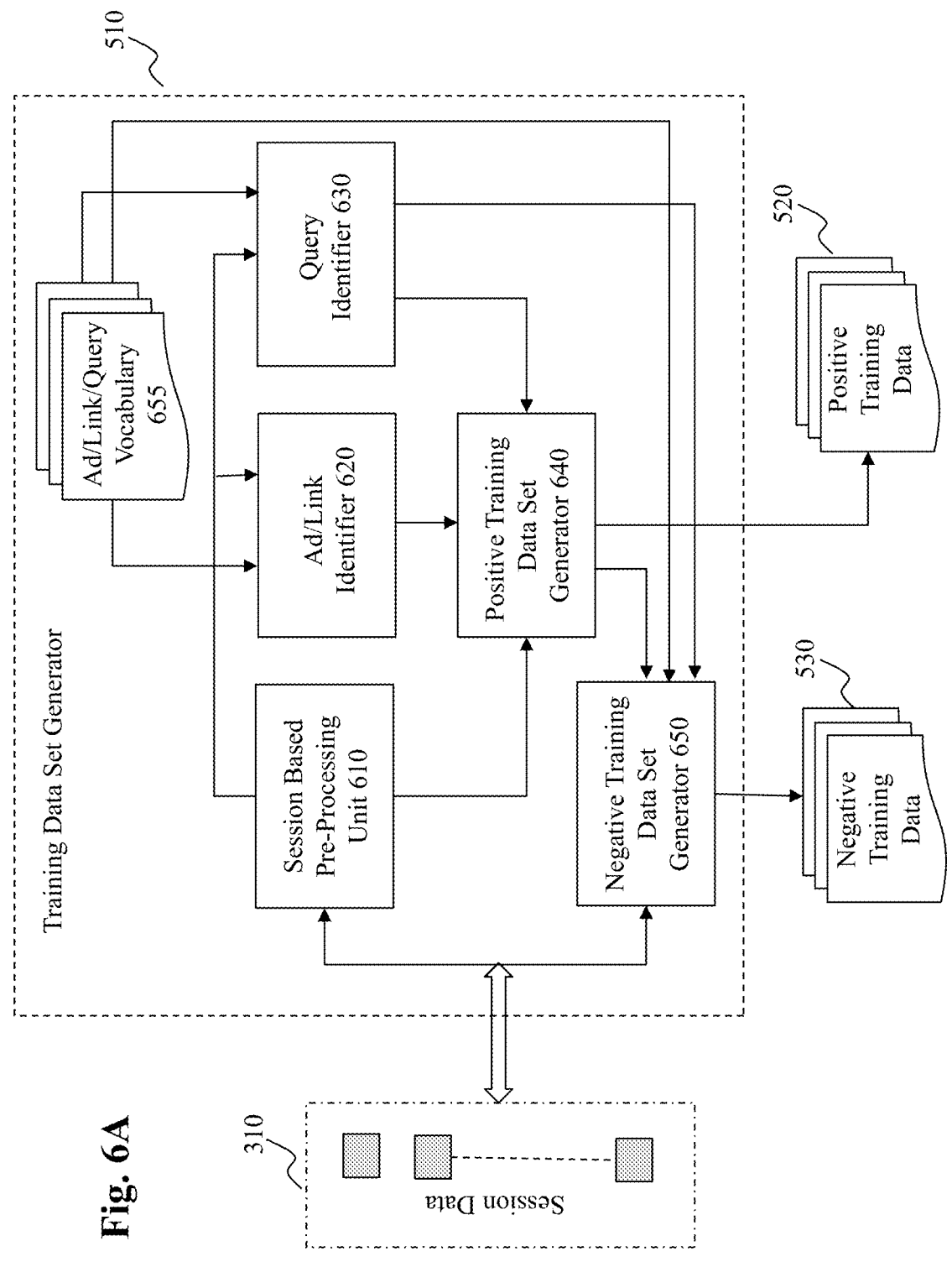
FIG. 6A depicts an exemplary high level system diagram of a training data generator, according to an embodiment of the present teaching.
Figure 6B:
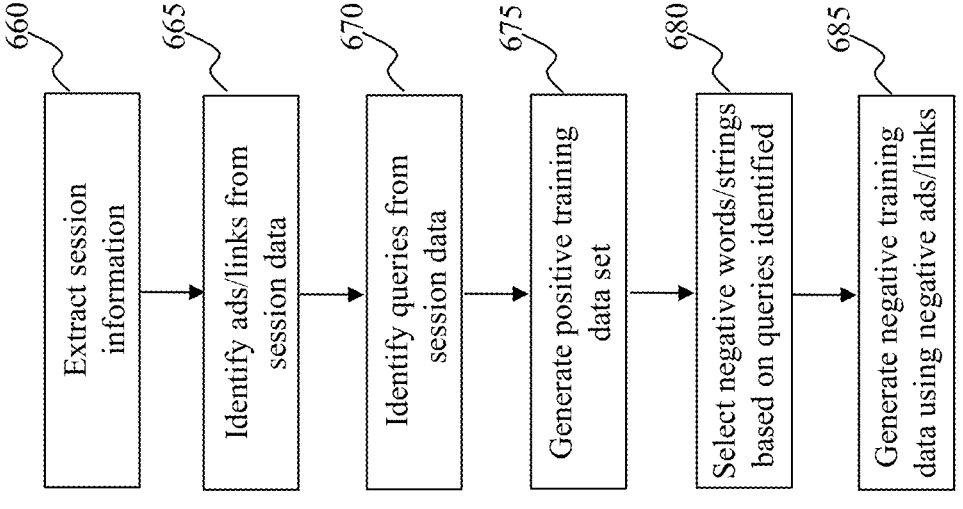
FIG. 6B is a flowchart of an exemplary process of a training data generator, according to an embodiment of the present teaching.

FIG. 6A depicts an exemplary high level system diagram of the training data set generator 510, according to an embodiment of the present teaching. In this exemplary embodiment, the training data set generator comprises a session based pre-processing unit 610, an ad/link identifier 620, a query identifier 630, a positive training data set generator 640, and a negative training data set generator 650. FIG. 6B is a flowchart of an exemplary process of the training data set generator 510, according to an embodiment of the present teaching. In operation, the session based pre-processing unit 610 extracts, from the session data 310, information related to each logged session at 660 and sends the extracted information related to each session to the ad/link identifier 620 and the query identifier 630. Upon receiving the information related to each session, the ad/link identifier 620 identifies, at 665, ads/links based on an ad/link/query vocabulary 655. Similarly, upon receiving the information related to each session, the query identifier 630 identifies, at 670, queries/words/subwords from the received session information.

Based on the identified ads/links and queries/words/subwords, the positive training data set generator 640 generates, at 675, the positive training data set. In some embodiments, the positive training data set comprises pairs, each of which includes a query or queries (or words/subwords contained therein) clicked ad(s) and clicked content link(s) that appear near each other in the session training data. Based on queries/words/subwords in the positive training data set, the negative training data set generator 650 selects, at 680, words/strings (corresponding to ads/links/queries) from the ad/link/query vocabulary 655 and pair them with the queries/ads/links from the positive training data set to generate, at 685, the negative training data set in storage 530.

In some embodiments, the session data 310 may include information related only to clicked ads and hyperlinks corresponding to the content associated with the clicked ads. In this case, the session data 310 provide positive pairings between queries and ads (and associated hyperlinks). In other embodiments, session data 310 may also include session information related to ads that were placed yet not clicked (and the associated hyperlinks). In this case, pairs of queries and clicked ads/links may be identified by the ad/link identifier 620 and query identifier 630. The ad/link/query vocabulary 655 may include words/phrases/text strings that may be used by the ad/link identifier 620 and query identifier 630 to recognize and extract the corresponding information they each seek to identify.

As discussed herein, once the positive training data set are generated, negative training data set is to be generated based on the words appearing in the positive training data set. In some embodiments, the negative training data set is generated in the following manner. For each ad/link/query appearing as the first of a pair from the positive data set, words or strings are selected from the ad/link/query vocabulary 655 based on some criterion and the selection is performed such that the selected words/strings do not or have low probability to appear together as positive pairs with the ad/link/query. Each pair in the negative training data set generated this way has a corresponding pair in the positive training data set and they are used as related training data (because they share an ad/link/query) in the learning.

In some embodiments, the negative training data set may be generated offline when the positive training data set is generated. In some embodiments, the negative training data set is generated on-the-fly during the training. For example, when a pair from the positive training data set is used in learning, a corresponding pair of the negative training data is generated by, randomly selecting the negative ads/link/query's from the ad/link/query vocabulary 655 based on some criterion. In some embodiments, the selection may be based on the following. A word occurrence count is computed for each ad/link/query event representing word and words with a minimum occurrence count are included in the vocabulary. The word occurrence counts are then used to derive a probability distribution with respect to words in the vocabulary. To select a word for a pair (w, w') from the positive training data set, where w is the input word (e.g., a query or a word/subword from the query) and w' is the positive output word (e.g., the word from a clicked ad). Given this positive example, negative examples may be generated by selecting k words, $w''\_1, w''\_2, \ldots w''\_k$, at random from the vocabulary according to the derived probability distribution, subject to the condition that $w''\_j \neq w'$ for $j=1, 2, \ldots k$. The resulting negative examples corresponding to the positive example (w, w') are then pairs (w, $w''\_1$), (w, $w''\_2$), \ldots, (w, $w''\_k$).

Figure 7:
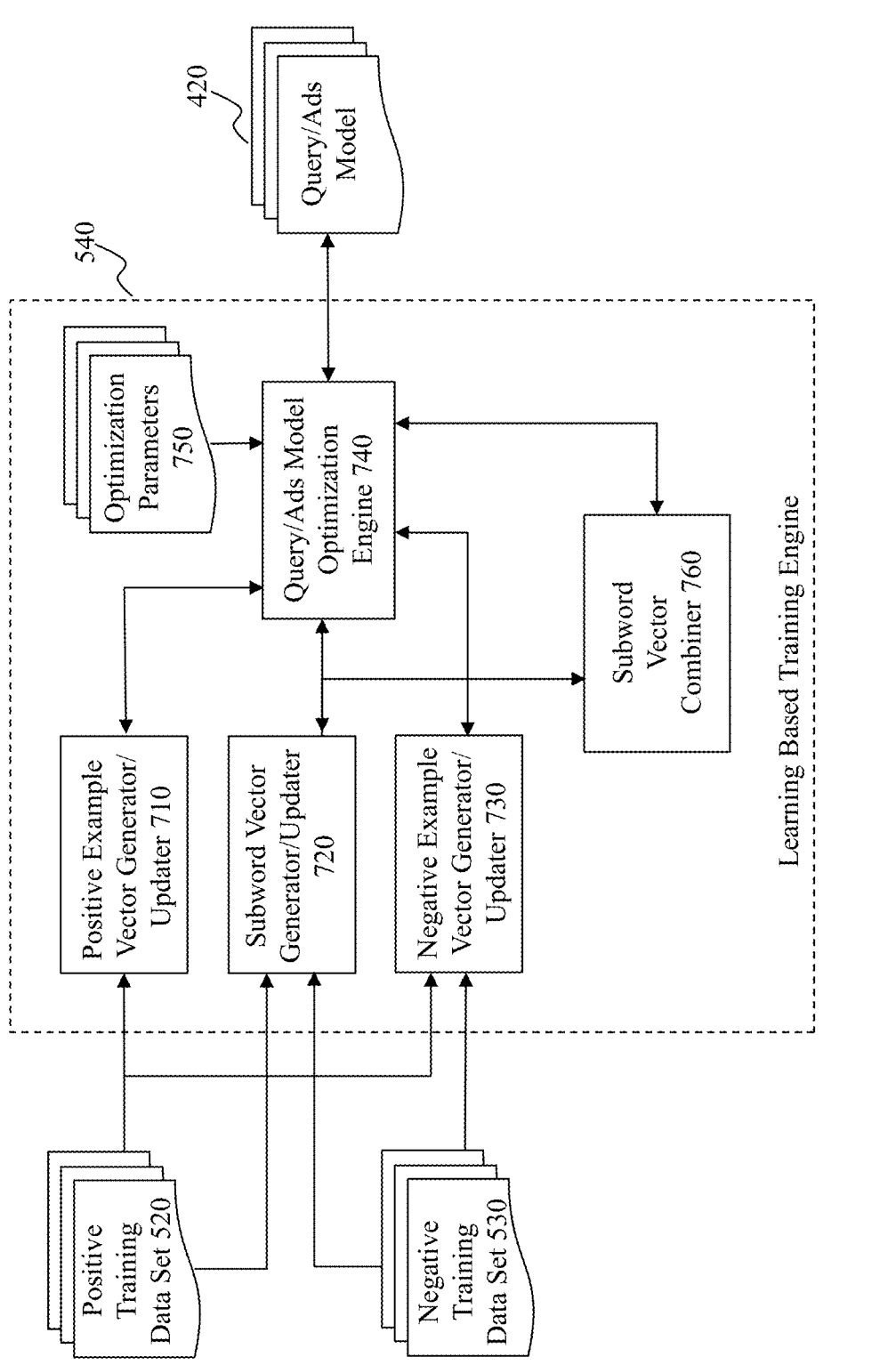
FIG. 7 depicts an exemplary high level system diagram of a learning based training engine, according to an embodiment of the present teaching.

Such generated positive and negative training data sets are then used for training the query/ad model 420, which is learned from the training data by maximizing the modeled probabilities for the positive examples from the positive training data set and minimizing the modeled probabilities for the negative examples from the negative training data set. As depicted in FIG. 5A, the training via learning is performed by the learning based training engine 540. FIG. 7 depicts an exemplary high level system diagram of the learning based training engine 540, according to an embodiment of the present teaching. In this illustrated embodiment, the learning based training engine 540 comprises a positive example vector generator/updater 710, a negative example vector generator/updater 730, a subword vector generator/updater 720, a subword vector combiner 760, and a query/ads model optimization engine 740.

Figure 8:
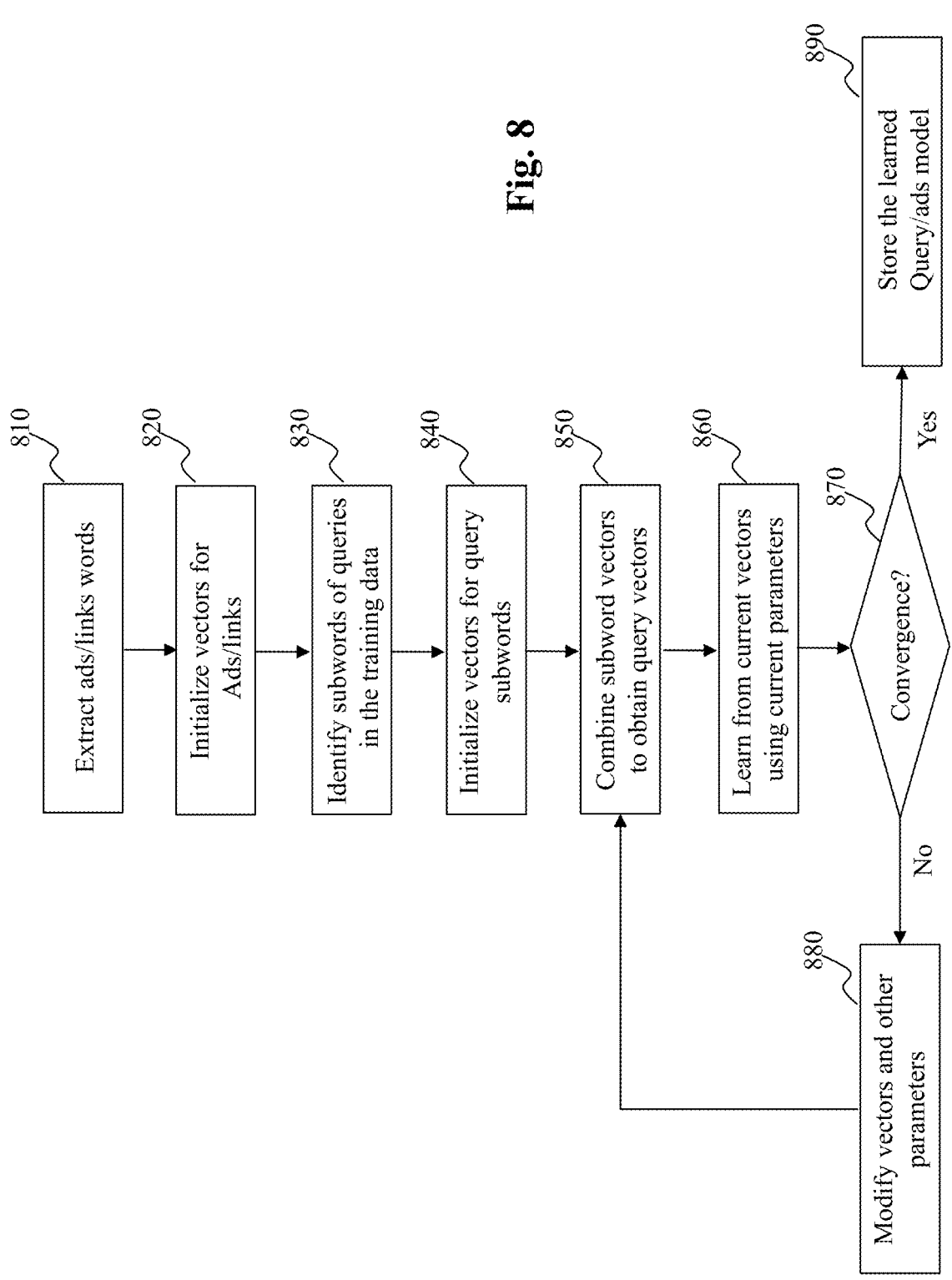
FIG. 8 is a flowchart of an exemplary process of a learning based training engine, according to an embodiment of the present teaching.

In operation, the learning based training engine 540 takes the positive and negative training data sets 520 and 530 as input and learns various parameters of the query/ads model 420 so that the model parameters are trained so that they maximize an objective function or minimize a loss function (discussed below) based on positive and negative examples from the training data. Parameters to be optimized via learning may be specified in a storage or archive 750 (optimization parameters). In some embodiments, such optimization parameters include vectors for queries/ads/links, vectors for subwords of the queries, and other parameters such as parameters used to combine subword vectors, etc. Vectors of queries/ads/links and subwords may have some specified dimensions, e.g., 300 or 500, and the values in each of such vectors in each dimension are to be learned via training. FIG. 8 is a flowchart of an exemplary process of the learning based training engine 540, according to an embodiment of the present teaching. To train the query/ads model 420, words/strings in vocabulary representing ads/links/ queries are first extracted from both positive and negative training data sets 520 and 530 at 810. Vectors (u vectors and/or v vectors) to be optimized for words from positive/ negative examples are first initialized at 820. Although it is illustrated that vectors for words from the positive training data set 520 and vectors for words from the negative training data set 530 are initialized by the positive example vector generator/updater 710 the negative example vector generator/updater 730, respectively, initialization may be done by one implemented vector generator/updater for both 710 and 730, as shown later in FIG. 9.

To initialize subword vectors for queries from the training data, subwords for queries are identified at 830 and u vectors for subwords are then initialized at 840 by the subword vector generator/updater 720. Based on the u vectors for subwords for each query, a u vector for the query is generated, at 850, by the subword vector combiner 760 via some configured combining function. Based on the vectors generated for ads/links, queries, and subwords, the query/ ads model optimization engine 740 learns, via an iterative process, these vectors/parameters. This iterative process involves steps 850, 860, 870, 880, and 890. Specifically, during each iteration of learning at 860 during the optimization process, an objective function (discussed below in detail) may be assessed in each iteration based on current vectors and parameters against some convergence conditions. If the conditions are not met (i.e., no convergence), determined at 870, the query/ads model optimization engine 740 proceeds to modify or adjust, at 880, the vectors/ parameters in a manner to drive the training towards convergence.

In some embodiments, the modifications to different vectors/parameters may be carried out all within the query/ads model optimization engine 740. In some embodiments, desired modifications to be made to different vectors and parameters may be determined by the query/ads model optimization engine 740. To carry out the modifications, the query/ads model optimization engine 740 may instruct corresponding components related to different vectors and parameters. For instance, vectors of ads/links/queries may be modified by positive/negative example vector generator/ updater 710 and 730, respectively, based on, e.g., instructions from the query/ads model optimization engine 740. Such instruction may specify, e.g., how each value in each of the vectors is to be changed, e.g., raise the value or lower the value by a given amount, determined by the query/ads model optimization engine 740 based on, e.g., gradient descent approach with respect to the objective function. Similarly, vectors associated with subwords may be modified/adjusted by the subword generator/updater 720 based on instructions issued by the query/ads model optimization engine 740. In some embodiments, parameters used by the subword combiner 760 may also be optimized (details disclosed below) and such parameters may be modified by the subword vector combiner based on instructions from the query/ads model optimization engine 740.

In some embodiments, u vectors for queries may be modified by combining relevant modified subword u vectors. That is, once the subword u vectors are modified based on instructions from the query/ads model optimization engine 740, the modified subword vectors are sent to the subword vector combiner 760 to generate modified u vectors for queries. In some embodiments, parameters utilized by the subword vector combiner 760 may also be modified during iterations. In this case, the subword vector combiner 760 may receive modification instructions from the query/ ads model optimization engine 740, modify the combiner parameters accordingly, and then use the modified combiner parameters and the modified subword u vectors to generate modified u vectors for queries. The learning process continues until the convergence condition is satisfied, determined at 870. At that point, the query/ads model is optimized with respect to the positive/negative training data sets 520/ 530. The optimized vectors/parameters are then stored as the query/ads model 420. When new positive/negative training data arrive, the query/ads model 420 may be further optimized based on the training data. According to the present teaching, different embodiments of optimizing the query/ads model 420 are disclosed and they are discussed in detail below.

Figure 9:
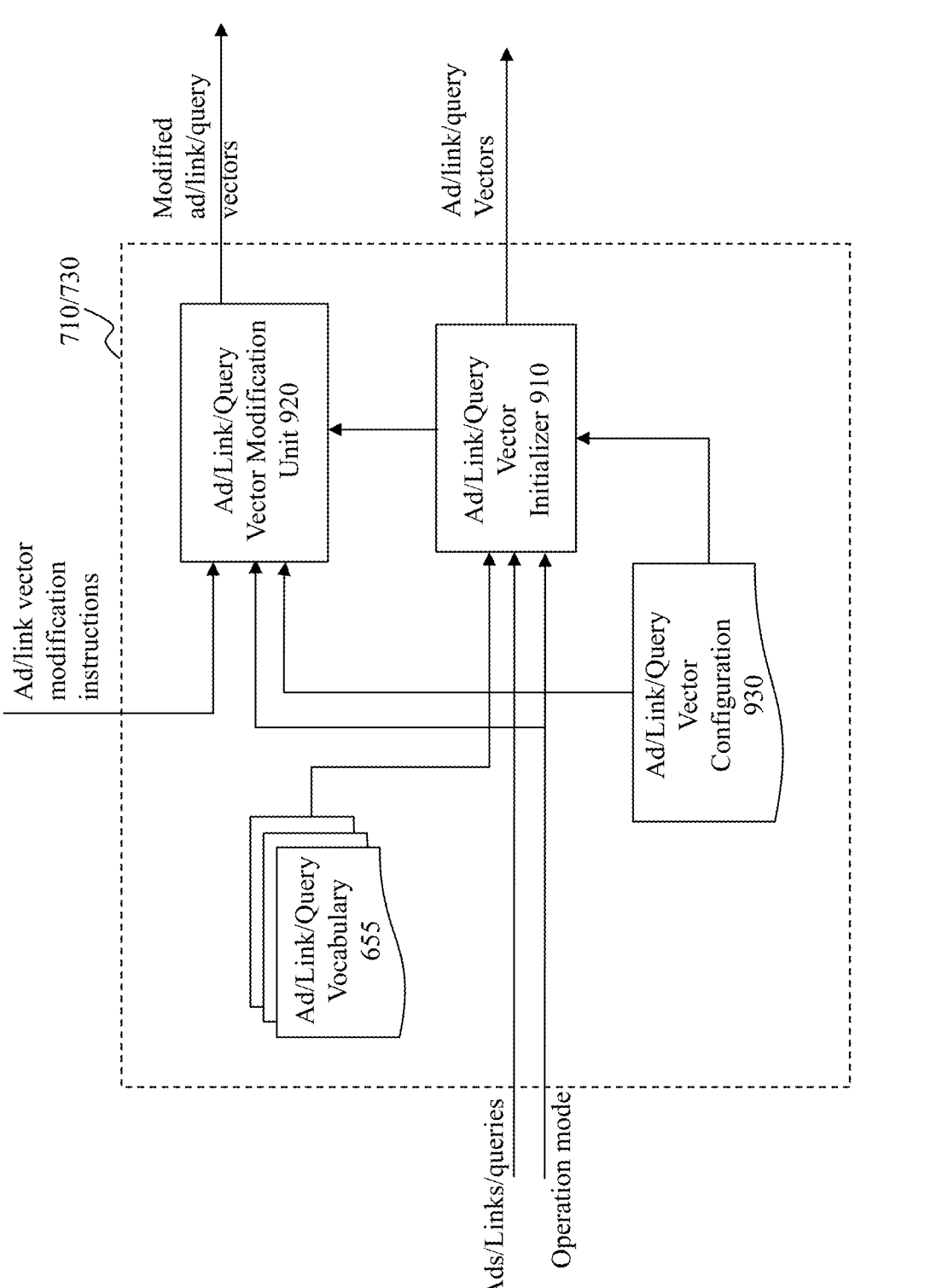
FIG. 9 depicts an exemplary high level system diagram of an ad/link vector generator/updater, according to an embodiment of the present teaching.

FIG. 9 depicts an exemplary high level system diagram of the ad/link vector generator/updater, according to an embodiment of the present teaching. Although FIG. 7 illustrates separate positive and negative example vector generator/updater 710 and 730, in some embodiments, they may correspond to the same module, as illustrated in FIG. 9. To generate and update vectors for ads/links/queries, the exemplary system diagram 710 or 730 comprises an ad/link/query vector initializer 910 and an ad/link/query vector modification unit 920. According to some embodiments of the present teaching, both u and v vectors for ads/links, v vectors for queries, u vectors for subwords of queries, as well as u vectors for queries (derived by combining u vectors of the subwords of the queries) are to be optimized. In these embodiments, the vector generator/updater 710/730 initializes and updates these vectors during the optimization process. Specifically, when ads/links/queries are received, the ad/link/query vector initializer 910 initializes these vectors according to an ad/link/query vector configuration 930, which may specify the dimension of the vectors and may also provide some initial seeds or default values for the attributes of the vectors. The initialized vectors are made available to the query/ads model optimization engine 740. When instructions for modifying any of the ad/link/query vectors are received by the ad/link/query vector modification unit 920, corresponding vectors for ads/links/queries are modified according to the received instructions. Such modified vectors are then made available to the query/ads model optimization engine 740 for the next round of learning. The vector modification updates continue until the query/ads model 420 is optimized.

Some different embodiments (which will be explained below) of the present teaching aim to reduce the number of vectors/parameters to be optimized. In such embodiments, vectors that are to be optimized include u vectors for ads/links and u vectors for subwords. In this case, module 710/730 may be configured, based on an input indicative of the operation mode, to initialize and modify u vectors for ads/links. That is, based on the value of the operation mode, the module 710/730 may be configured, as needed, to generate/modify vectors for different types of words.

Figure 10A:
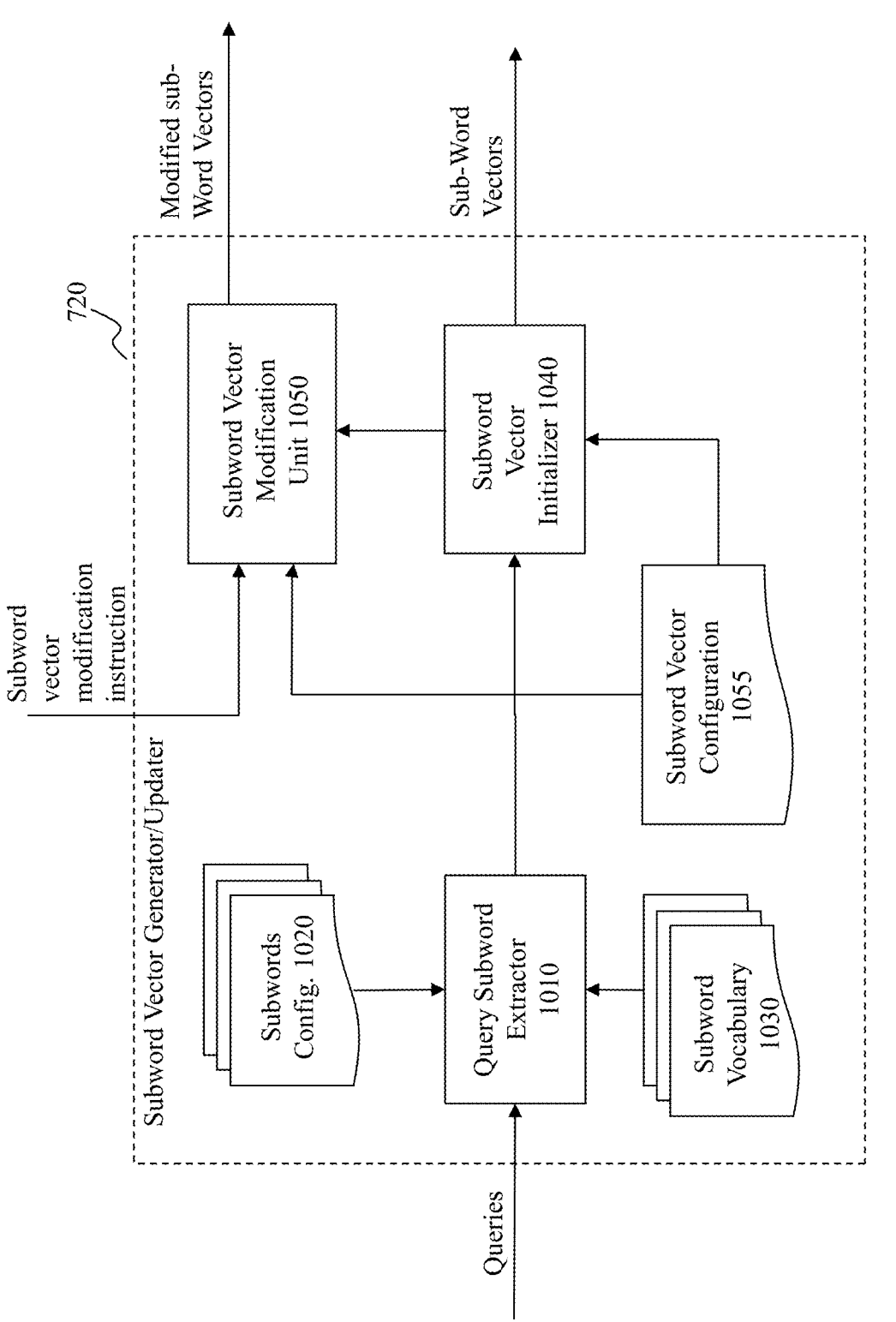
FIG. 10A depicts an exemplary high level system diagram of a subword vector generator/updater, according to an embodiment of the present teaching.
Figure 10B:
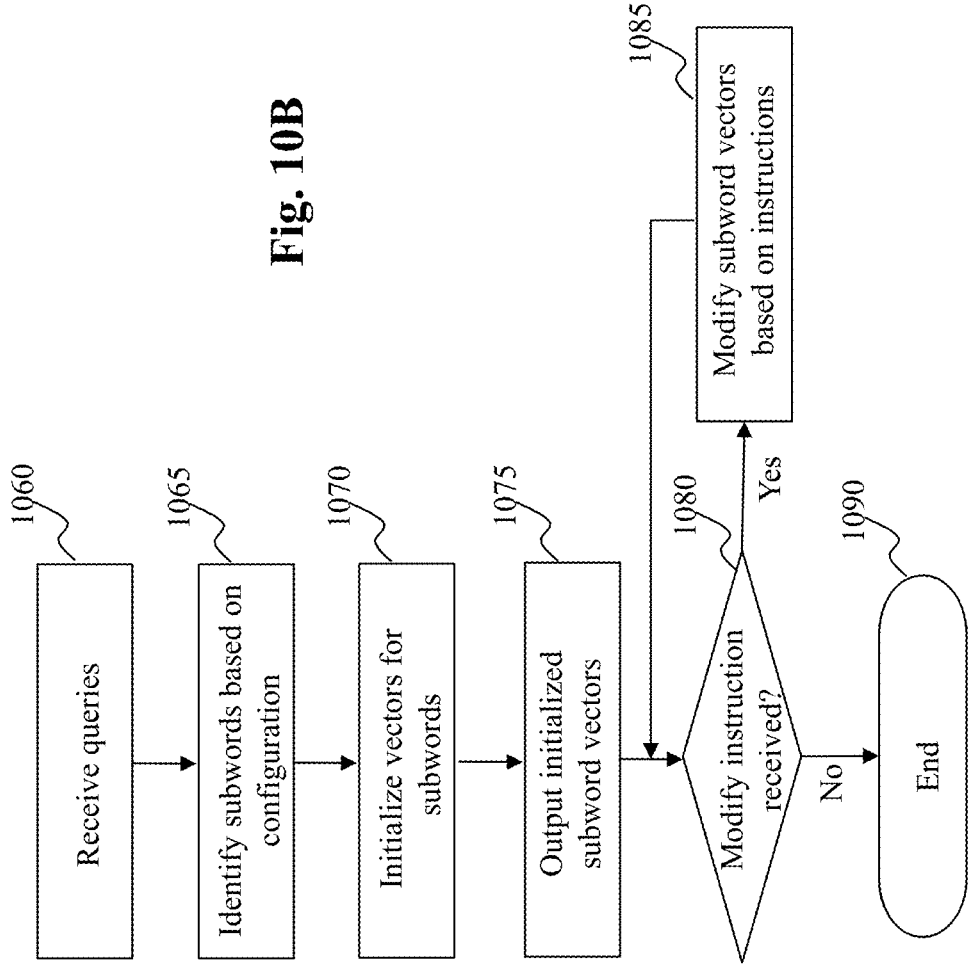
FIG. 10B is a flowchart of an exemplary process of a subword vector generator/updater, according to an embodiment of the present teaching.

FIG. 10A illustrates an exemplary high level system diagram of the subword vector generator/updater 720, according to an embodiment of the present teaching. In this illustrated embodiment, the subword vector generator/updater 720 includes components that extracts, from each query, subwords, initializes subword vectors, and then during optimization process, modifies subword vectors based on instructions from the query/ads model optimization engine 740. Specifically, this embodiment comprises a query subword extractor 1010, a subword vector initializer 1040, and a subword vector modification unit 1050. FIG. 10B is a flowchart of an exemplary process of the subword vector generator/updater 720, according to an embodiment of the present teaching. In operation, when the query subword extractor 1010 receives, at 1060, a query, it identifies, at 1065, subwords based on, e.g., pre-specified subword configuration 1020. In some embodiments, the subword configuration 1020 may specify the form of subwords to be optimized, e.g., unigram and bigram or even trigram. Based on such configuration 920, the query subword extractor 1010 identifies subwords from the received queries. The extraction may also be based on a defined subword vocabulary 1030 or $SQ$, as discussed below.

The extracted subwords are then sent to the subword vector initializer 1040, where the u vectors for the subwords are initialized, at 1070, based on, e.g., a subword vector configuration 1055. In some embodiments, the subword vector configuration 1055 may specify the dimension of u vectors for subwords and such dimensionality may be adjusted depending on application needs. The initialized subword vectors are then sent, at 1075, to the query/ads model optimization engine 740 for learning and to the subword vector combiner 760 so that u vectors for queries by combining u vectors for their corresponding subword vectors (see FIG. 7). During the iterative optimization process, when the subword vector modification unit 1050 in the subword vector generator/updater 720 receives an instruction for modifying subword vectors, determined at 1080, the subword vector modification unit 1050 modifies, at 1085, the current subword vectors (either received from the subword vector initializer 1040 or from previously modified subword vectors stored therein) according to the received instruction. The modified subword vectors are then made available to the query/ads model optimization engine 740 for learning and to the subword vector combiner 760 so that u vectors for queries can be generated by combining u vectors for their corresponding subword vectors. The modification continues whenever an instruction from the query/ads model optimization engine 740 is received. If there is no instruction received for modifying the subword vectors, the processing ends at 1090.

Referring back to FIG. 7, as discussed herein, the subword vector combiner 760 is used to combine u vectors of subwords of a query to generate a u vector for the query. According to the present teaching, subword vector combiner 760 may be implemented in different embodiments, depending on, e.g., the optimization schemes employed. Below, a number of optimization schemes according to the present teaching are discussed. Prior approaches to query/ads matching employ a pair of input and output vectors for each query Qi, namely (u(Qi), v(Qi)). Such prior approaches also provide pairs of input and output vectors (u, v) for ads and hyperlinks in the training data, i.e., for each ad Ai or a hyperlink Li, a pair of input and output vectors, (u(Ai), v(Ai)) or (u(Li), v(Li)) is provided. These vectors for queries/ads/links are learned during training based on positive and negative examples in the training data.

Such prior approaches treat each query as a separate vocabulary word and such approaches are not able to generate vectors for queries that are new or do not occur often enough in training data to train reliable vectors via the prior approach. These prior approaches also do not scale well because there are hundreds of millions of unique queries even though some of them may have similar meanings. In contrast, the present teaching instead uses subwords and vectors thereof and then derives u vectors for queries for training. According to the present teaching, for each query, subwords of the query are identified and u vectors for subwords are trained during learning. In addition, u vectors of queries are derived based on their subword u vectors. Together with u vectors for ads/links, as well as optionally v vectors for ads/links/queries, different alternative optimization schemes according to the present teaching to train the query/ads model 420 are discussed below.

In a first optimization scheme of the present teaching, u and v vectors for ads/links are used as in the prior approaches. With respect to queries, subwords are used and u vectors for subwords of a query are used to derive a u vector for the query. In some embodiments, v vectors for queries may also be trained. In this scheme, if a query Qi has m subwords, i.e., $sw(Qi)=sw_1, sw_2, sw_3, \ldots, sw_m$, and u vectors for the subwords are $u(sw_1), u(sw_2), \ldots, u(sw_m)$, the u vector for query Qi may be derived by combining, with some combining function m, the u vectors for its subwords, i.e., $u(Qi)=m(u(sw_1), u(sw_2), \ldots, u(sw_m))$.

Figure 11A:
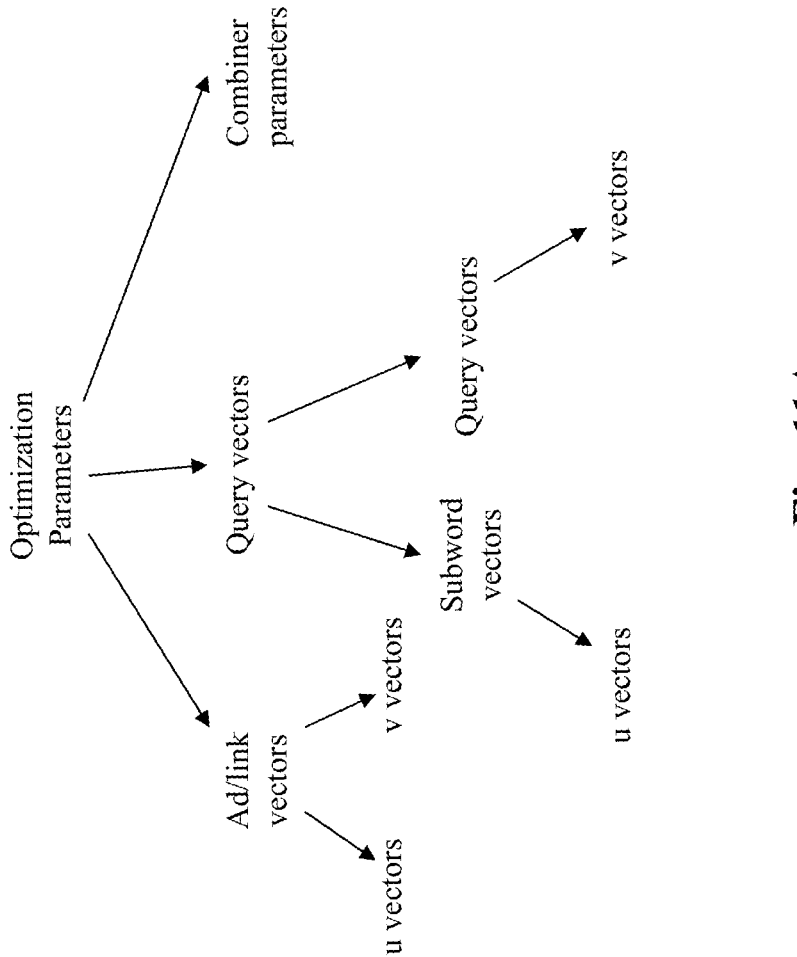
FIG. 11A illustrates exemplary types of vectors to be trained for a model for matching queries to ads, according to an embodiment of the present teaching.

There may be different alternative combining functions. For instance, u vectors for subwords may be simply component-wise averaged to derive u(Qi). Alternatively, the combining function m may correspond to more complex, e.g., a component-wise weighted sum of u vectors for subwords to derive u(Qi) for the underlying query. Details about different combining schemes are discussed with reference to FIGS. 11C-13B. Depending on the combining function, parameters used in such combining functions may also be trained. For example, the weights used in a combiner that uses component-wise weighted sum may be optimized during training. FIG. 11A illustrates the exemplary parameters that may be trained in this first optimization scheme, according to embodiments of the present teaching. As shown, in this scheme, what may be optimized includes u and v vectors for ads/links, u vectors for subwords of queries, v vectors for queries, and optionally certain parameters related to the combining function m used by the subword vector combiner 760.

The optimization in this first scheme is described in detail as follows. The goal is to optimize vectors for ads/links/queries/subwords and parameters, assuming the above procedure for generating u(Qi) for Qi in the query space. More specifically, given a corpus comprising a sequence of search sessions $s_1, s_2, \ldots, s_n$, each of which includes a sequence of words $s_i = w_{i,1}, w_{i,2}, \ldots, w_{i,mj}$, with $w_{i,j} \in \mathcal{V} = \mathcal{A} \cup \mathcal{Q} \cup \mathcal{H}$, where $\mathcal{V}$ is a set of words for which vectors are trained, which includes queries, ads, and hyperlinks, respectively denoted by $\mathcal{Q}$, $\mathcal{A}$ and $\mathcal{H}$, and the vocabulary also includes $\mathcal{S}$, $\mathcal{Q}$ which comprises a set of subwords of queries in $\mathcal{Q}$. For example, if the query lazy boy recliner sofas is in $\mathcal{Q}$ then $\mathcal{S}$, $\mathcal{Q}$ may include the unigram words lazy, boy, recliner, sofa, and possibly the bigrams lazy boy, boy recliner, recliner sofa (and more generally, trigrams (e.g., groups of three consecutive words in the query.

According to the first optimization scheme as disclosed herein, in addition to vector pairs for ads/links, i.e., (u(Ai), v(Ai)) and (u(Li), v(Li)), for a query Qi in $\mathcal{Q}$, output vectors $v(Qi)$, and u vectors for subwords $u(sw_1), u(sw2), \ldots, u(sw_m)$ are trained. As discussed herein, given a mapping $sw: \mathcal{Q} \rightarrow \mathcal{S} \mathcal{Q}^*$, i.e., from a query to a sequence of subwords (e.g., unigrams and/or bigrams appearing in the query) and a combining function m for combining a sequence of u vectors for subwords to generate a u vector for the query. That is, if sw $(\mathcal{Q}\,i)$=sw$_1$, sw$_2$, sw$_3$, . . . , sw$_m$, we have $$u(\mathcal{Q}\,i)=m(u(sw_1),u(sw2), \ldots ,u(sw_m)) \quad (1)$$

The following objective function is used to optimize these vectors (including subword vectors u(sw$_j$)), provided that the above combining function m is used to generate u($\mathcal{Q}\,i$) when $\mathcal{Q}\,i$ is in $\mathcal{Q}$. Specifically, given a corpus having a sequence of search sessions s$_1$, s$_2$, . . . , s$_n$, each of which comprises a sequence of words s$_i$=w$_{i,1}$, w$_{i,2}$, . . . , w$_{i,mi}$, with w$_{i,j}\in\mathcal{V}=\mathcal{A}\cup\mathcal{Q}\cup\mathcal{H}$, the object is to maximize the following log likelihood in (2) below over u vectors u(sw) for s $w\in\mathcal{A}\cup\mathcal{H}\cup\mathcal{S}$ W and v vectors v(w) for all $w\in\mathcal{A}\cup\mathcal{H}\cup\mathcal{Q}$ with u(w) generated according to a combining function m as in (1) above, when $w\in\mathcal{Q}$.

$$\sum_{i=1}^{n}\sum_{j:w_{i,j}\in V}\sum_{\substack{k\neq j:|k-j|\leq b_{i,j}\\ w_{i,k}\in V}}\left[\log\sigma(u(w_{i,j})v^T(w_{i,k}))+\right.$$
$$\left.\sum_{\tilde{w}\in N_{i,j,k}}\log(1-\sigma(u(w_{i,j})v^T(\tilde{w})))\right] \quad (2)$$

where the w$_{i,j}$ and w$_{i,k}$ correspond to a positive pair (e.g., a query and a clicked ad/link) from the positive training data set 520 and w$_{i,j}$ and $\tilde{w}$ is a negative pair from the negative training data set 530, with $\tilde{w}$ being selected randomly from the vocabulary according to a probability distribution, as discussed herein. In addition, $\sigma(\cdot)$ denotes the sigmoid function $\sigma(x)=1/(1+e^{-x})$, window sizes b$_{i,j}$ may be randomly selected so that each inner sum includes between 1 and a maximum B terms, each negative example associated with a positive w$_{i,k}$ is selected from N$_{i,j,k}$. The training may be carried out using some known algorithms such as minibatch SGD optimization with respect to the various word and subword vectors.

In query to ad matching problems, the objective is to maximize a modeled probability of co-occurrence of a "context" word (e.g., clicked ad) and a central word (e.g., query) in a positive example pair, for example, as modeled by the sigmoid appearing in (2). Prior approaches perform the optimization over all pairings between all words and all words in their context, which is computationally expensive. One approach is to use skipgram with negative examples so that the optimization is carried out by maximizing the objective (2) which tends to both maximize the modeled probability, as represented by the first sigmoid in (2), that a context word appears with a central word in a positive example and at the same time tends to minimize the modeled probability, as represented by the second sigmoid in (2), that words (randomly selected based on, e.g., word frequencies) not in the context co-occur as a negative example pair with the central word.

Using positive/negative training examples, the above optimization scheme tends to maximize the modeled probability with respect to the positive examples (from positive training data set 520) that the pair of words co-occurs in each such example and at the same time tends to minimize the probability with respect to the negative examples (from negative training data set 530) that the pair of words co-occurs in each such example. In some implementation, the gradient descent approach is used to train a logistic regression classifier that distinguishes between positive and negative example pairs. The objective (2) corresponds to optimizing the log-loss of such a classifier.

According to the present teaching, other alternative optimization schemes may also be used to learn different vectors/parameters to derive the query/ads model 420. In one alternative optimization scheme, the number of vectors/parameters that are to be optimized is reduced to improve learning efficiency. As discussed herein, a word in the vocabulary in the disclosed optimization is defined broadly and may encompass conventional English words that make up a query or a string encoding representing an advertisement, queries themselves, hyperlinks, and subwords (bigrams, trigrams, etc.). Each of such word is characterized in the optimization scheme by a vector of a certain dimension. For example, an English word or unigram may be represented by a vector with a dimension of 200. For a string such as a phrase or a hyperlink, a vector may have a higher dimension, e.g., 300. To derive the query/ads model 420, these vectors are all to be optimized in an iterative process. In addition, other parameters may also be optimized (as will be shown below), which can be thus both memory and computation intensive.

To reduce the number of parameters to be optimized, the following can be used in an alternative optimization scheme to derive the query/ads model 420.

$$P1(w_{i,k} \text{ in context of } w_{i,j}|w_{i,j},w_{i,k})=$$
$$\sigma(u(w_{i,k})^TAu(w_{i,j}))=1/(1+\exp(-u(w_{i,k})^TAu(w_{i,j})),$$
$$\text{and}$$

$$P2(\tilde{w} \text{ not in context of } w_{i,j}|w_{i,j},\tilde{w})=\sigma(-u(\tilde{w})^TAu(w_{i,j}))$$

where pair (w$_{i,j}$, w$_{i,k}$) is a positive example and pair (w$_{i,j}$, $\tilde{w}$) is a negative example, u(w) is a u vector for word w, A is an asymmetric matrix, P1 is the probability of co-occurrence of words in a positive example, and P2 is the probability of no co-occurrence of words in a negative example. Given a query w$_{i,j}$, its u vector or u(w$_{i,j}$) is to be derived based on subword vectors for subwords of query w$_{i,j}$. The goal is to maximize the objective (2) with the argument of the first log replaced by P1 and the argument of the second log replaced by P2 by learning or optimizing u vectors for all subwords in all queries, u vectors for all w$_{i,k}$ and $\tilde{w}$ as well as parameters used to combine subword vectors to derive u vectors for queries. This tends to maximize both P1 and P2 on respective positive and negative example pairs.

Figure 11B:
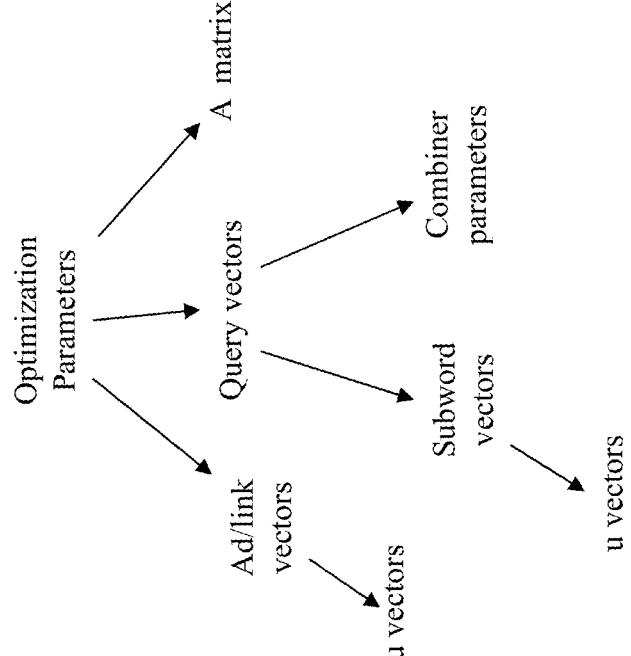
FIG. 11B illustrates exemplary types of vectors to be trained for a model for matching queries to ads, according to a different embodiment of the present teaching.

According to this alternative embodiment of the present teaching, v vectors for ads/links/queries are no longer used for training and, hence, reduce the number of parameters to be optimized. Instead, only u vectors for ads/links/subwords/queries, the asymmetric matrix A, and optionally certain parameters used to combine u vectors for subwords to derive u vector for queries are used to characterize the query/ads model 420 and are trained. FIG. 11B illustrates the exemplary vectors/parameters that are to be optimized in this alternative optimization scheme.

Referring back to FIG. 7, the query/ads model optimization engine 740 is to learn query/ads model 420 in an iterative process based on the positive/negative training data sets 520/530, in accordance with any of the optimization schemes as discussed herein. As discussed herein, in addition to optimizing various vectors, in some embodiments, parameters used by the subword vector combiner 760 may also be trained or optimized. As depicted in FIG. 7, subword u vectors are combined by the subword vector combiner 760 to generate u vectors for queries. According to the present teaching, different alternative embodiments may be used to combine subword vectors.

Figure 11C:
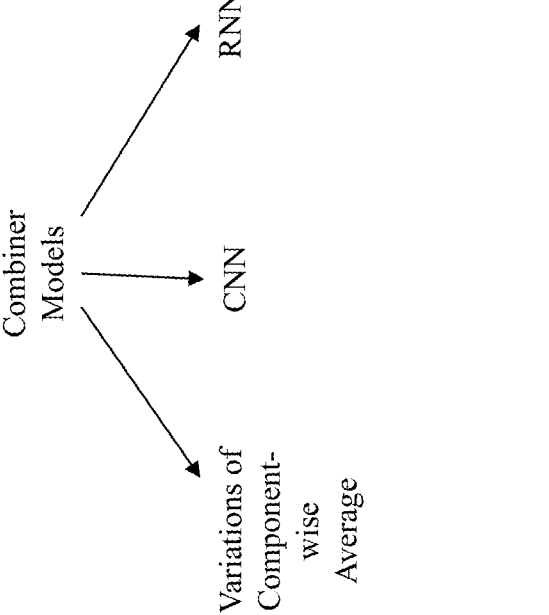
FIG. 11C presents exemplary approaches for combining query subword vectors to generate a query vector, according to an embodiment of the present teaching.

FIG. 11C illustrates some exemplary approaches that can be used to combine subword u vectors to derive query u vectors. As shown, different variations based on component-wise averaging may be used. In addition, subword u vectors may also be combined to generate query u vectors using deep neural net based query embedding. In FIG. 11C, two exemplary neural net based query embedding methods are illustrated. One is convolutional neural network (CNN) based approach and the other is recurrent neural network (RNN) based approach. Each of the exemplary methods is discussed below.

Figure 12A:
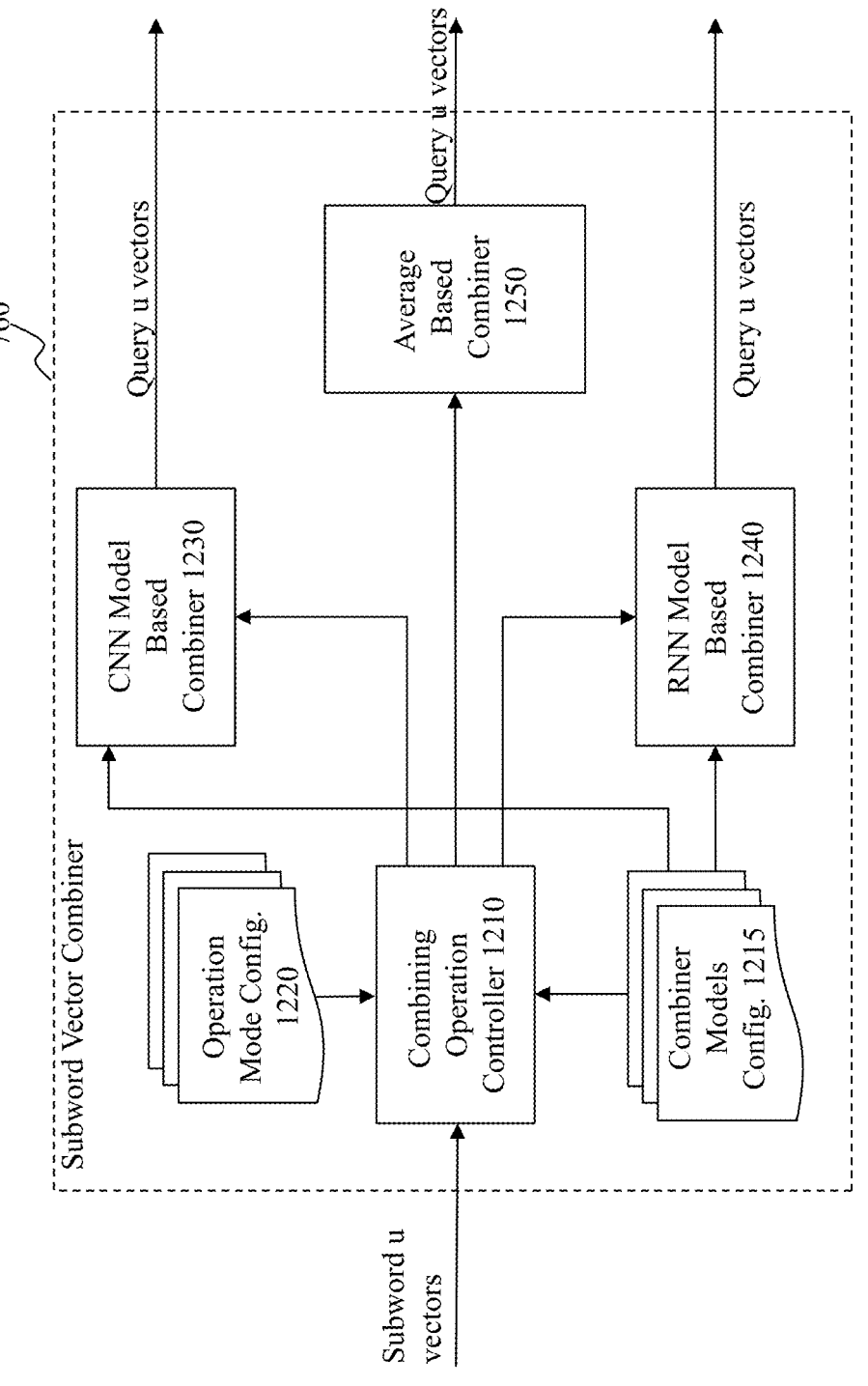
FIG. 12A depicts an exemplary high level system diagram of a subword vector combiner, according to an embodiment of the present teaching.
Figure 12B:
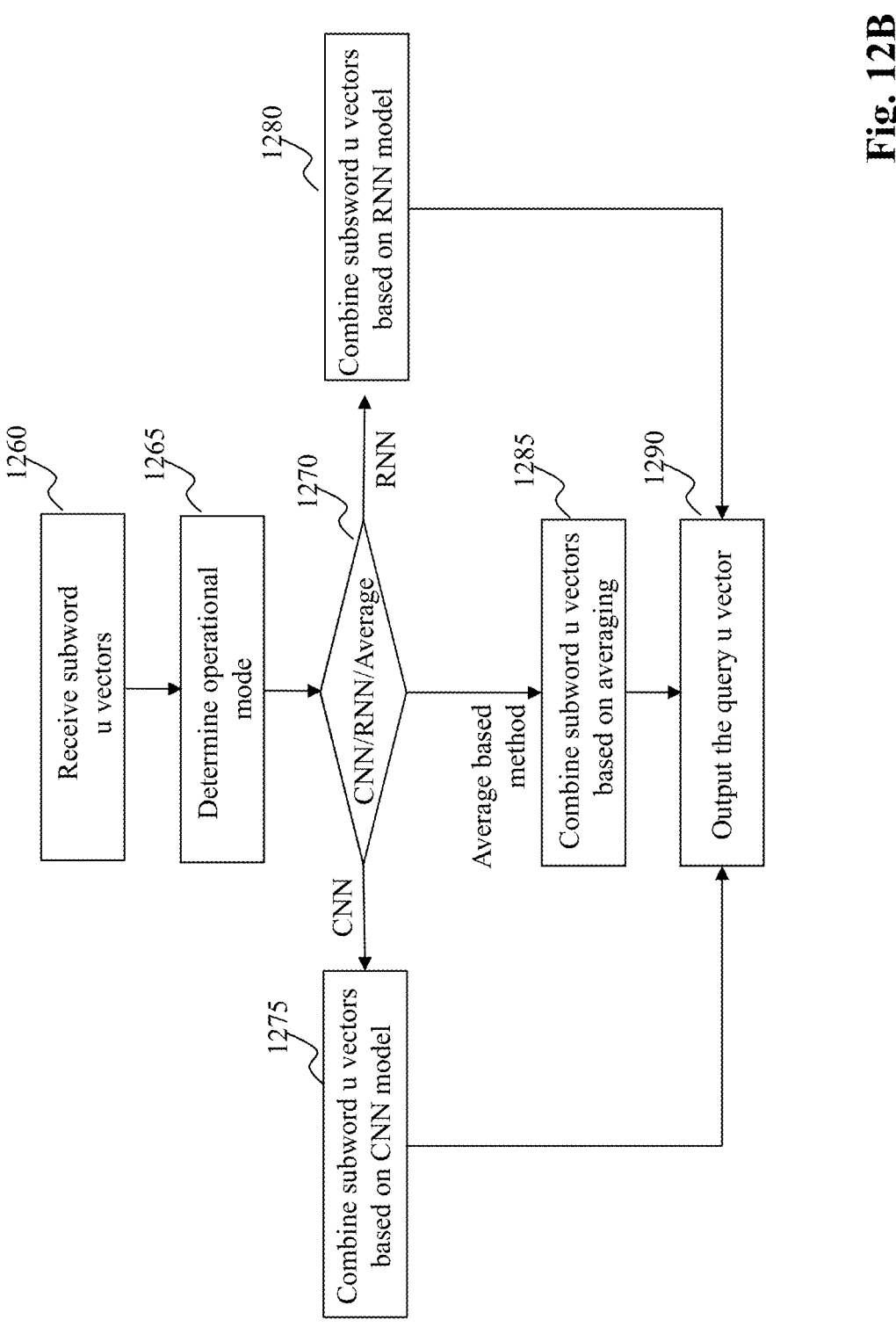
FIG. 12B is a flowchart of an exemplary process of a subword vector combiner, according to an embodiment of the present teaching.

FIG. 12A depicts an exemplary high level system diagram of the subword vector combiner 760 and FIG. 12B is a flowchart of an exemplary process of the subword vector combiner 760, according to one embodiment of the present teaching. In this exemplary embodiment, the subword vector combiner 760 comprises a combining operation controller 1210, an average based combiner 1250, a CNN model based combiner 1230, and an RNN model based combiner 1240. In operation, any of the combiners may be applied based on a configured operation mode configuration 1220. That is, the operation mode configuration 1220 may be configured to apply one of the combiners based on, e.g., application needs.

In operation, when subword u vectors are received by the combining operation controller 1210 at 1260 (FIG. 12B), the combining operation controller 1210 determines, at 1265, the configured operation mode. If the configured mode is CNN, determined at 1270, the combining operation controller 1210 invokes the CNN model based combiner 1230 to combine, at 1275, the received subword u vectors based on CNN model to generate a u vector for the underlying query. If the configured mode is RNN, determined at 1270, the combining operation controller 1210 invokes the RNN model based combiner 1240 to combine, at 1280, the received subword u vectors based on RNN model to generate a u vector for the underlying query. Otherwise, the combining operation controller 1210 invokes the average based combiner 1250 to combine, at 1285, the received subword u vectors to generate a u vector for the underlying query. The generated u vector for the query is then output, at 1290, to the query/ads model optimization engine 740 (see FIG. 7). Below, specific embodiments of each of the averaging, CNN, and RNN model based combiners are discussed.

With respect to averaging based combiners, alternative average based combining functions may be employed. In some embodiments, to combine u vectors for unigram subwords of a query to yield a u vector for the query, a component-wise average function may be used, i.e., $$m(u(sw_1), u(sw_2), \ldots, u(sw_m)) = \frac{1}{m} \sum_k u(sw_j)$$

A different combining function may also be employed to combine u vectors for unigram subwords that, e.g., performs component-wise average plus average of pair-wise component-wise products, i.e., $$m(u(sw_1), u(sw_2), \ldots, u(sw_m)) =$$

$$\frac{1}{m} \sum_j u(sw_j) + b \odot \frac{2}{m(m-1)} \sum_{i<j} u(sw_i) \odot u(sw_j)$$

Where $\odot$ denotes component-wise vector product, i.e., $[x_1, x_2, \ldots, x_d] \odot [y_1, y_2, \ldots y_d] = [x_1 y_1, x_2 y_2, \ldots, x_d y_d]$.

In some embodiments, the combining vector b may also be optimized during training.

Yet in another embodiment of the combining function for unigram subwords may perform average and pair wise fixed combination. That is, using the combining function m as discussed right above but with combining vector b set as a constant vector (as opposed to being trained) with component equal to average of trained components of trained b from the previous model.

The above mentioned combining functions may also be applied to other types of subwords, such as bigrams or combinations of, e.g., unigrams and bigrams. For instance, the combining function using component-wise average may be applied to bigram subwords. If a query is "lazy boy recliner sofas," then bigram subwords can be "lazy boy," "boy recliner," and "recliner sofas." Then the u vectors for query "lazy boy recliner sofas" may be derived by performing component-wise average of the u vectors for all bigrams of the query.

A combining function may also be applied to u vectors derived for different types of subwords. For example, u vectors for unigrams and u vectors for bigrams may be combined to generate a u vector for the query that gives rise to these subwords. For instance, the above query "lazy boy recliner sofas" may lead to unigrams "lazy," "boy," "recliner," and "sofas" as well as bigrams "lazy boy," "boy recliner," and "recliner sofas." The u vectors for these unigrams and bigrams may then be combined, e.g., using component-wise average, to derive the u vector for query "lazy boy recliner sofas."

Figure 13A:
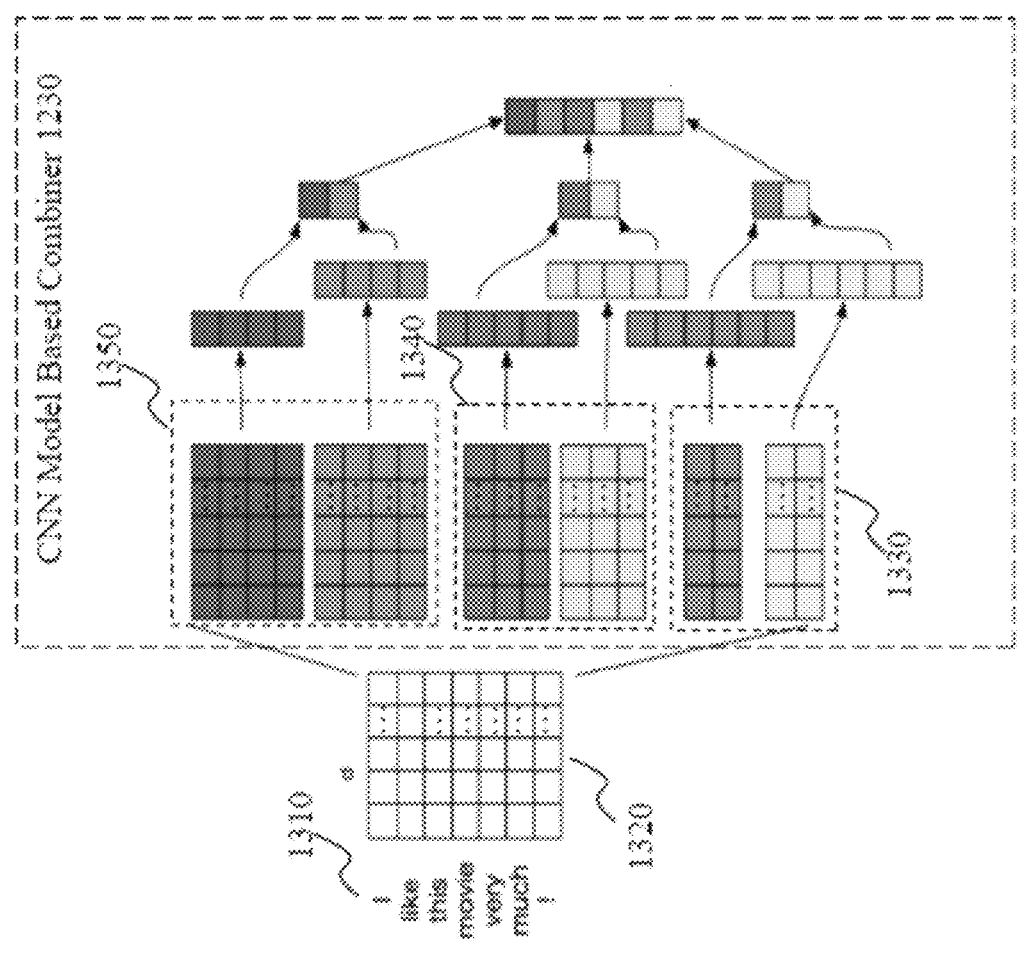
FIG. 13A depicts an exemplary high level system diagram of a CNN model based combiner, according to an embodiment of the present teaching.

With respect to the CNN model based combiner, FIG. 13A depicts an exemplary architecture of the CNN model based combiner 1230, according to an embodiment of the present teaching. This illustrated CNN model uses multiple filters for 2-grams, 3-grams, and 4-grams, and does a pooling operation (e.g., max-pooling). The operation concatenates the vectors and uses a dense filter to bring it down to a specific dimension (e.g., for queries). In this example, an example query 1310 is provided, which is "I like this movie very much!" In accordance with this exemplary CNN architecture, inputs to the CNN model are u vectors of unigram subwords (I, like, this, movie, . . . ). The goal is to construct a u vector for the entire query.

In this illustrated CNN model based combiner, there are 6 filters employed, illustratively 2 filters of width 2 (1330), 2 filters of width 3 (1340), and 2 filters of width 4 (1350). Here, "width" corresponds to the number of filter coefficients in the vertical direction in each filter. The number of coefficients in the horizontal direction may corresponds to the dimension d of the subword vectors. Each of the coefficients in each of the filters may also be optimized during the training. In this embodiment, a filter of width 2 in 1330 operates on all contiguous bigram pairs ("I like," "like this," "this movie," . . . ) and produces a single number for each bigram pair, i.e., the inner product of the filter coefficients and the vertically stacked pair of corresponding subword vectors.

The filter is shifted down one subword at a time to get the outputs for each pair of subword vectors. More generally, the filters of width w analogously operate on all w contiguous stacks of subword vectors, producing one output number for each. Collectively, the sequence of outputs for each filter can be thought of as a vector of outputs corresponding to that filter. Thus the query of length 7 would result in a vector of size 6 for filters of width 2, size 5 for width 3 and size 4 for width 4, as shown in FIG. 13A. Now a pooling operation (e.g., a max pool) takes this vector for each filter and produces a single number. The reasoning behind this is that the pooling operation chooses the most relevant set of words for each filter. In this manner, the filters would be trained to identify different patterns in the data. In this specific example, there are finally 6 numbers (dimensions) corresponding to 6 filters, corresponding to the u vector for the example query. Although only 6 filters are illustrated, in real applications, the number may be much higher, such as 600 numbers (dimensions) corresponding to a CNN model architecture with 600 filters. A dense layer of the neural net may be employed to bring this down to a desired lower dimension if needed. Various parameters associated with the CNN model may be trained, e.g., the coefficients of the filters and of the fully connected layers as well as the unigrams vectors. Hyper parameters that may also be optimized include the number of layers in the CNN to bring down to the desired dimension for the vector of a query, the number of filters used in each layer, the width of each filter, the number of subwords to be used, etc.

Figure 13B:
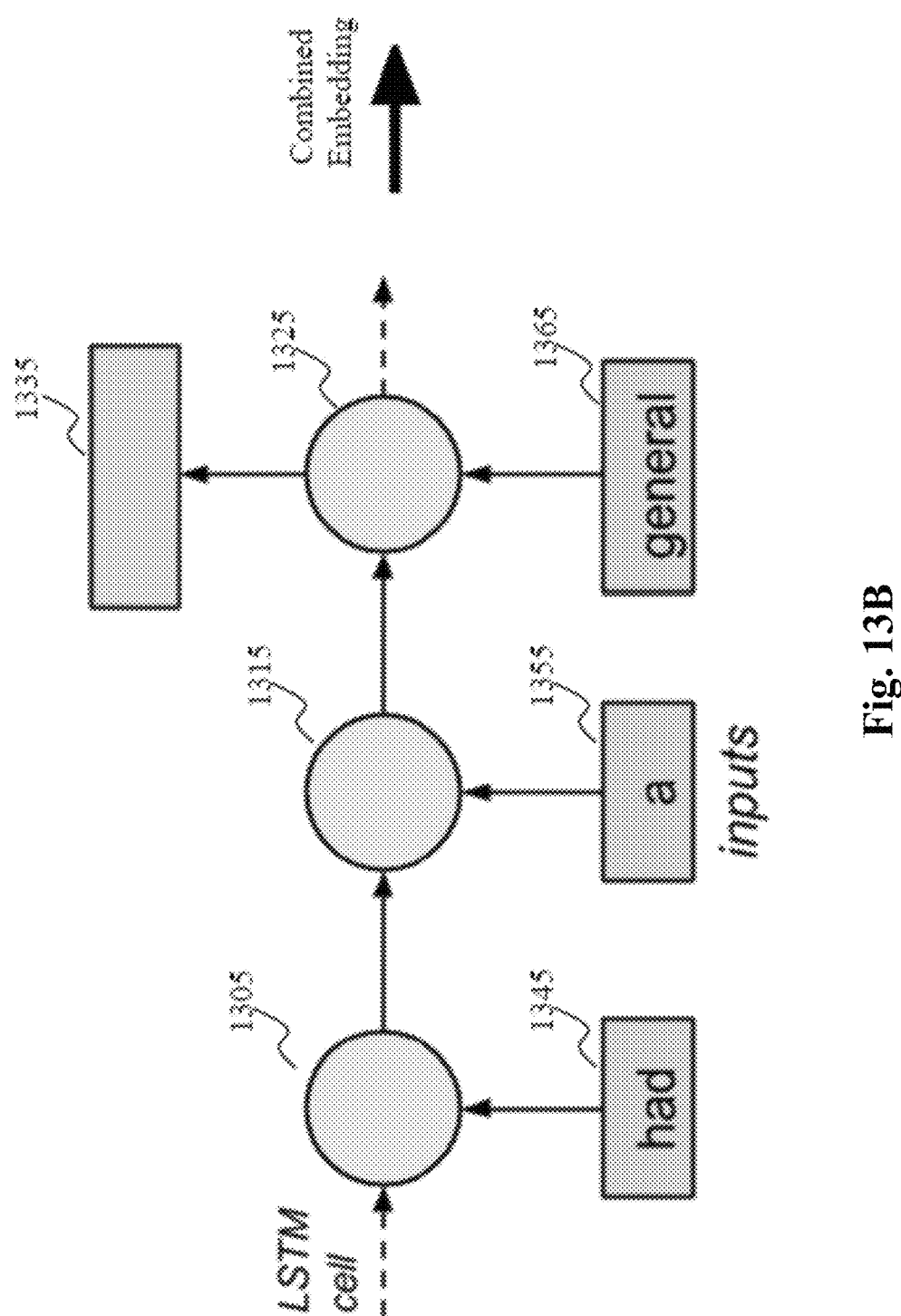
FIG. 13B depicts an exemplary high level system diagram of an RNN model based combiner, according to an embodiment of the present teaching.

FIG. 13B illustrates an exemplary architecture of the RNN model based combiner 1240, according to an embodiment of the present teaching. In this illustrated example, an RNN-BiLSTM encoder is provided. It has long-short term memory or LSTM cells connected in series, 1305, 1315, 1325, . . . , each of which is associated with a transition function that, when receiving an input, acts to transform a current state vector of the cell to generate a next state vector. Such a RNN based LSTM cells architecture has certain memory and the state transition of each cell depends not only on the input it receives but also the prior state vector it has encoded representing, in a sense, the prior memory. In this manner, the exemplary RNN model based combiner, as shown in FIG. 13B, may explicitly use the temporality of a sequence of input words and the LSTM cells serve as gated cells with some long term memory.

This illustrated RNN-BiLSTM architecture may be used to combine a plurality of subword vectors to generate a u vector for a query. In some embodiments, u vectors of the subwords from the query are fed, in sequence, into LSTM cells. Each cell combines its input with a state vector that it possesses and generates a new state vector. According to the present teaching, to result in a u vector of a query, a bidirectional operation is performed. In one direction, one LSTM sequence is run from left to right, i.e., the first subword of the query is fed in the LSTM cell sequence first and last subword of the query is fed in to the LSTM cell sequence last. In the other direction, the LSTM sequence is run from right to left, i.e., the last subword of the query is fed in to the LSTM cell sequence first and the first subword of the query is fed last. The state vectors of the respective last LSTM cells after the bidirectional operations may then be combined (e.g. concatenated) and used as the u vector of the query.

In some embodiments, parameters associated with or used in the RNN model based combiner may be trained. For example, the initial state vectors of each of the LSTM cells, the parameters associated with the transition functions associated with the LSTM cells, etc. may be subject to training.

According to various embodiments of the present teaching, the query/ads model 420, once trained, comprises vectors for words in the vocabulary and parameters to be used to combine subword vectors to generate vectors for queries. When the trained query/ads model 420 is applied to identify appropriate advertisement(s) given a query, the query/ads model 420 may be looked up for vectors of subwords and advertisements and trained parameters may be used to plug in a subword vector combiner to generate, e.g., vectors for the queries based on the subword vectors. This is illustrated in 4A, where the trained query/ads model 420 is utilized by the query/ads model based ad selector 430 to select, among a plurality of candidate ads, one or more advertisements most appropriate given a query presented.

Figure 14:
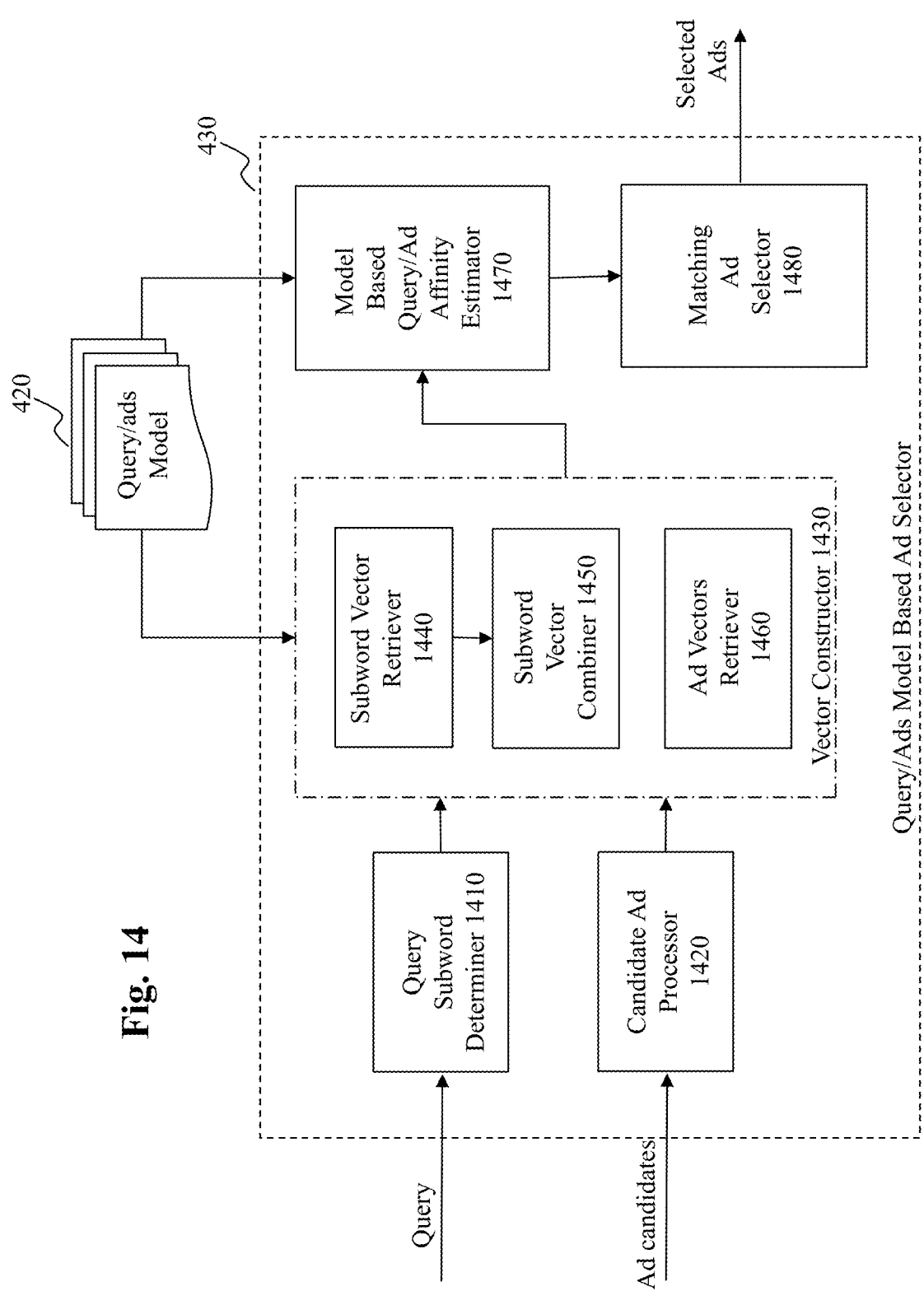
FIG. 14 depicts an exemplary high level system diagram of a query/ads model based ad selector, according to an embodiment of the present teaching.

FIG. 14 depicts an exemplary high level system diagram of the query/ads model based ad selector 430, according to an embodiment of the present teaching. In this illustrated embodiment, the query/ads model based ad selector 430 comprises a query subword determiner 1410, a candidate ad processor 1420, a vector constructor 1430, a model based query/ad affinity estimator 1470, and a matching ad selector 1480. The vector constructor 1430 further comprises a subword vector retriever 1440 which, based on the subwords from the input query, retrieves the trained vectors for such subwords from the query/ads model 420, an ad vector retriever 1460 which retrieved vectors for the ad candidates from the query/ads model 420, and a subword vector combiner 1450 that may retrieve the parameter values from the query/ads model 420 and use such parameter values in its combining operation to generate vector(s) for the input query based on the subword vectors from the subword vector retriever 1440.

Figure 15:
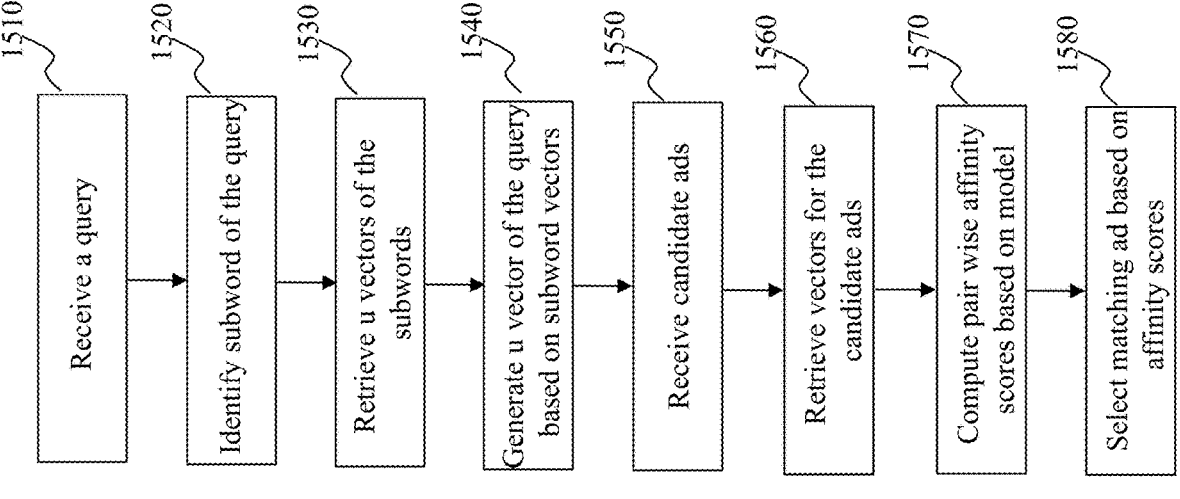
FIG. 15 is a flowchart of an exemplary process of a query/ads model based ad selector, according to an embodiment of the present teaching.

FIG. 15 is a flowchart of an exemplary process for the query/ads model based ad selector 430, according to an embodiment of the present teaching. In operation, when the query subword determiner 1410 receives, at 1510, an input query, it identifies, at 1520, subwords of the input query. Based on the extracted subwords, the subword vector retriever 1430 retrieves, at 1530 from the query/ads model 420, u vectors for the subwords of the query and sends the subwords u vectors to the subword vector combiner 1440 to be combined. Optionally, the subword vector combiner 1440 may retrieve (e.g., if parameters related to combining subword vectors are optimized) trained parameters related to the combining function. With the subword vectors, the subword vector combiner 1440 generates, at 1540, the u vector for the query based on the subword vectors with, optionally, the parameters for the combiner retrieved from the query/ads model 420. In some embodiments, v vectors for the input query may also be retrieved from the query/ads model 420 (not shown). For example, when the optimization scheme as depicted in FIG. 11A is used, v vectors for queries are also trained and stored in the query/ads model 420 and may be used in identifying a matching advertisement given an input query.

For a given input query, to identify a matching advertisement, the candidate ad processor 1420 receives, at 1550, a plurality of candidate ads, from which one or more matching advertisements can be selected. To achieve that, the received candidate ads are sent to the ad vector retriever 1450, which then retrieves, at 1560, vectors for each of the candidate ads. Depending on the embodiment of the present teaching used to identify a matching ad, what is retrieved for each of the candidate ads may include both u and v vectors or u vectors only. With the vectors for subwords of the input query, the vector(s) for the query, and the vectors for each of the candidate ads, the model based query/ad affinity estimator 1460 computes, at 1570, an affinity score for each pair of the input query and one of the candidate ads. Based on such affinity scores for all the candidate ads, the matching ad selector 1470 may then select, at 1580, one or more matching advertisements.

Figure 16:
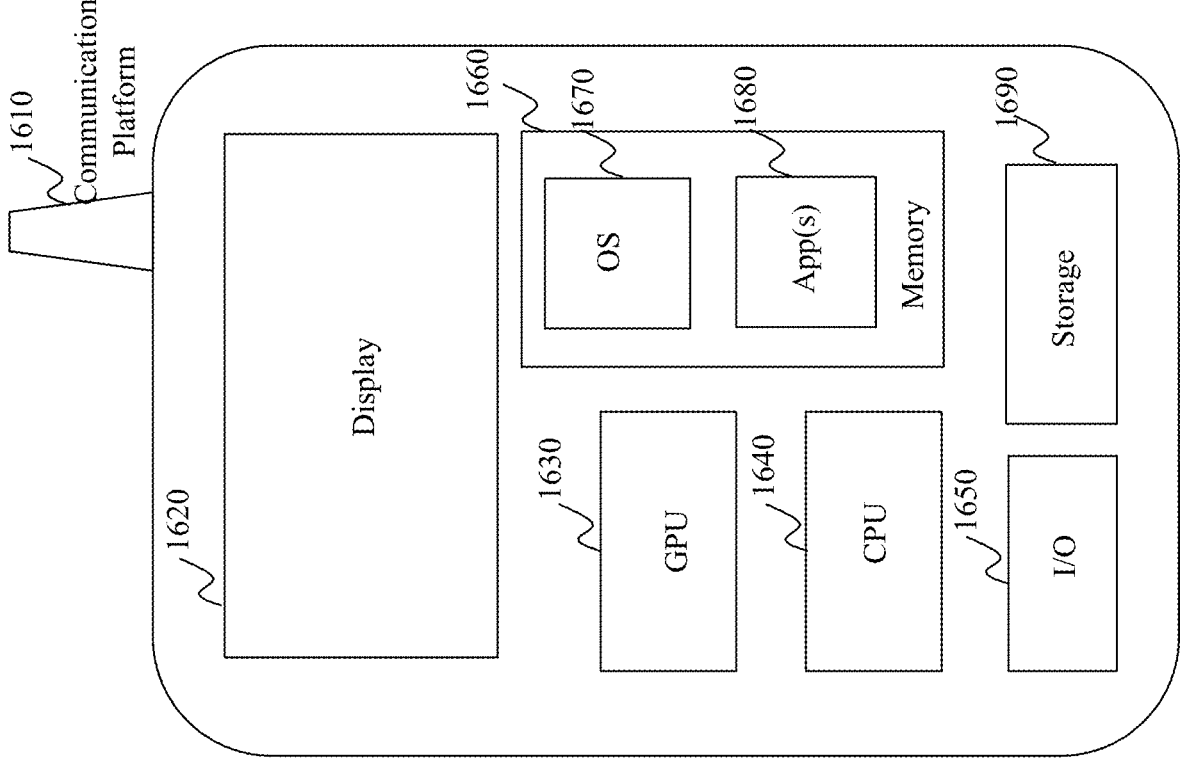
FIG. 16 depicts the architecture of a mobile device which can be used to implement a specialized system incorporating the present teaching.

FIG. 16 depicts the architecture of a mobile device which can be used to realize a specialized system implementing the present teaching. In this example, the user device on which content and advertisement are presented and interacted-with is a mobile device 1600, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1600 in this example includes one or more central processing units (CPUs) 1640, one or more graphic processing units (GPUs) 1630, a display 1620, a memory 1660, a communication platform 1610, such as a wireless communication module, storage 1690, and one or more input/output (I/O) devices 1650. Any other suitable component, including but not limited to a system bus or a controller (not shown), may also be included in the mobile device 1600. As shown in FIG. 16, a mobile operating system 1670, e.g., iOS, Android, Windows Phone, etc., and one or more applications 1680 may be loaded into the memory 1660 from the storage 1690 in order to be executed by the CPU 1640. The applications 1680 may include a browser or any other suitable mobile apps for receiving and rendering content streams and advertisements on the mobile device 1600. Communications with the mobile device 1600 may be achieved via the I/O devices 1650.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to query to ads matching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 17:
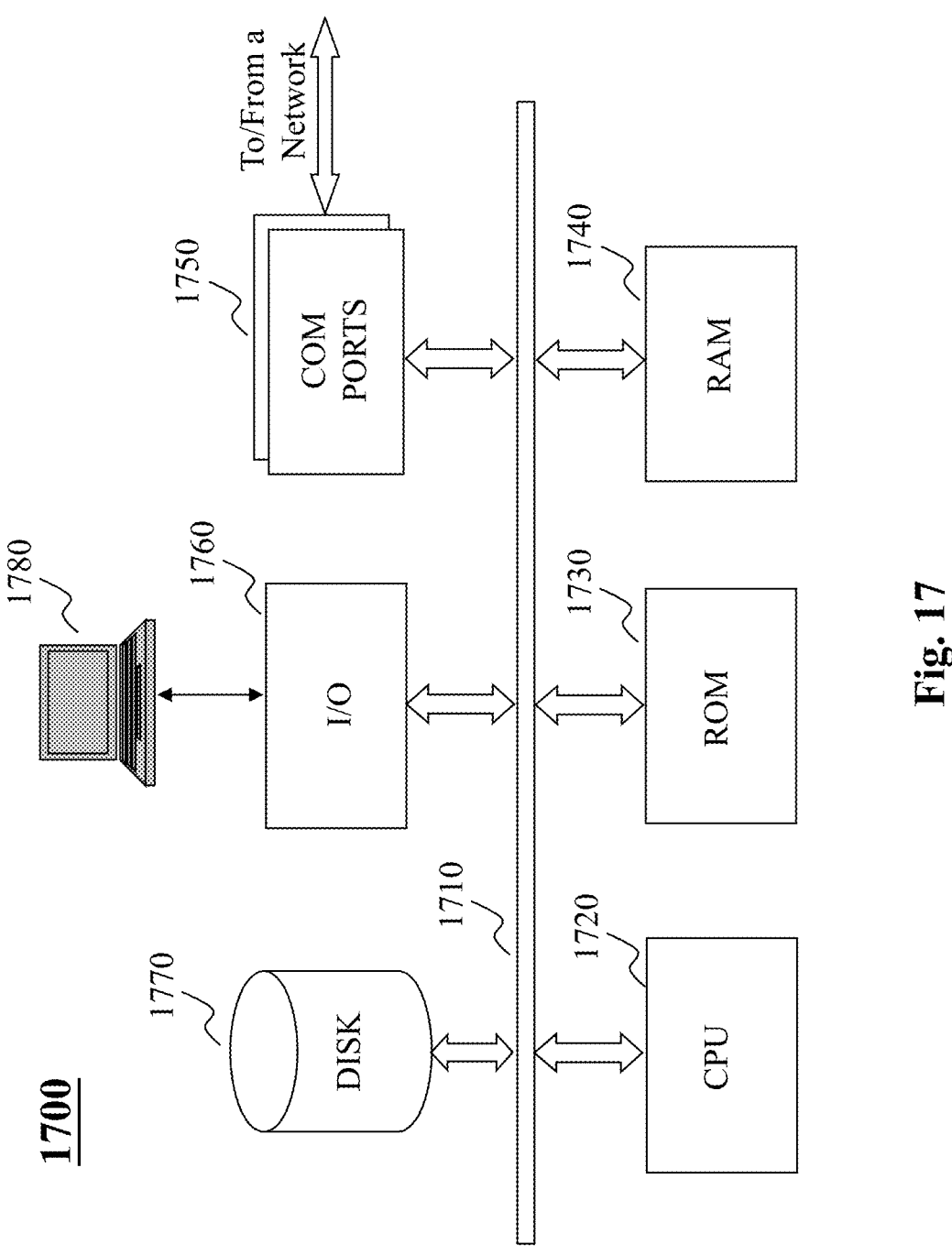
FIG. 17 depicts the architecture of a computer which can be used to implement a specialized system incorporating the present teaching.

FIG. 17 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1700 may be used to implement any component of the present teaching, as described herein. For example, the query/ads matching engine 250 may be implemented on a computer such as computer 1700, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 1700, for example, includes COM ports 1750 connected to and from a network connected thereto to facilitate data communications. The computer 1700 also includes a central processing unit (CPU) 1720, in the form of one or more processors, for executing program instructions. The exemplary computer platform includes an internal communication bus 1710, program storage and data storage of different forms, e.g., disk 1770, read only memory (ROM) 1730, or random access memory (RAM) 1740, for various data files to be processed and/or communicated by the computer, as well as possibly program instructions to be executed by the CPU. The computer 1700 also includes an I/O component 1760, supporting input/output flows between the computer and other components therein such as user interface elements 1780. The computer 1700 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform for training a query/ads model used for identifying content matching a query, comprising:

generating, by a model training engine, training data including positive and negative training samples derived based on previous query sessions, wherein each training sample in the training data comprises a query, one or more advertisements previously displayed with search results related to the query, and hyperlinks linking to the search results and one or more advertisements, wherein the positive training samples include at least one pair of words representing user events that appear within a predetermined number of temporally ordered user events in the query sessions and the negative training samples include pairs of words that are randomly selected from the query sessions;

reducing a number of parameters of the query/ads model by removing v vectors for the query, the one or more advertisements, and the hyperlinks to improve efficiency in training the query/ads model;

generating, for each of the query, the one or more advertisements, and the hyperlinks in the training data, a vector by:

identifying, by the model training engine, a plurality of subwords in the query, advertisement, or hyperlink, and reducing a dimension for the vector by combining, via one of a convolutional neural network (CNN) and a recurrent neural network (RNN), a plurality of subword u vectors for the plurality of subwords to generate the vector for the query, the advertisement, or the hyperlink; and training, by the model training engine via machine learning, the query/ads model, by optimizing the parameters of the query/ads model through maximizing a modeled probability with respect to the positive training samples and minimizing the modeled probability with respect to the negative training samples.

2. The method of claim 1, wherein the combining is further via one of:

one that performs component-wise averaging; or one that performs component-wise average with average of pair wise component-wise product.

3. The method of claim 1, further comprising:

receiving the future query and a plurality of candidate advertisements identified based on the query;

identifying a set of subwords from the future query;

retrieving, from the query/ads model, vectors for the set of subwords and vectors for the plurality of candidate advertisements; and selecting, from the plurality of candidate advertisements, at least one selected advertisement for the query based on the vectors for the set of subwords and the vectors for the plurality of candidate advertisements.

4. The method of claim 3, wherein the step of selecting is performed further based on a vector of the future query obtained based on the vectors for the set of subwords of the future query.

5. A non-transitory, machine readable-medium having information recorded thereon for training a query/ads model used for identifying content matching a query, wherein the information, when read by the machine, causes the machine to perform the following:

generating training data including positive and negative training samples derived based on previous query sessions, wherein each training sample in the training data comprises: a query, one or more advertisements previously displayed with search results related to the query, and hyperlinks linking to the search results and one or more advertisements, wherein the positive training samples include at least one pair of words representing user events that appear within a predetermined number of temporally ordered user events in the query sessions and the negative training samples include pairs of words that are randomly selected from the query sessions;

reducing a number of parameters of the query/ads model by removing v vectors for the query, the one or more advertisements, and the hyperlinks to improve efficiency in training the query/ads model;

generating, for each of the query, the one or more advertisements, and the hyperlinks in the training data, a vector by:

identifying a plurality of subwords in the query, advertisement, or hyperlink, and reducing a dimension for the vector by combining, via one of a convolutional neural network (CNN) and a recurrent neural network (RNN), a plurality of subword u vectors for the plurality of subwords to generate the vector for the query, the advertisement, or the hyperlink; and training, via machine learning, the query/ads model, by optimizing the parameters of the query/ads model through maximizing a modeled probability with respect to the positive training samples and minimizing the modeled probability with respect to the negative training samples.

6. The non-transitory, machine readable-medium of claim 5, wherein the combining is further via one of:

one that performs component-wise averaging; or one that performs component-wise average with average of pair wise component-wise product.

7. The non-transitory, machine readable-medium of claim 6, wherein the information, when read by the machine, further causes the machine to perform:

receiving the future query and a plurality of candidate advertisements identified based on the query;

identifying a set of subwords from the future query;

retrieving, from the query/ads model, vectors for the set of subwords and vectors for the plurality of candidate advertisements; and selecting, from the plurality of candidate advertisements, at least one selected advertisement for the query based on the vectors for the set of subwords and the vectors for the plurality of candidate advertisements.

8. The non-transitory, machine readable-medium of claim 7, wherein the step of selecting is performed further based on a vector of the future query obtained based on the vectors for the set of subwords of the future query.

9. A system having a processor, storage, and a communication platform capable of connecting to a network for training a query/ads model used for identifying content matching a query, comprising:

a subword vector identifier implemented by the processor and configured for generating training data including positive and negative training samples derived based on previous query sessions, wherein each training sample in the training data comprises a query, one or more advertisements previously displayed with search results related to the query, and hyperlinks linking to the search results and one or more advertisements, wherein the positive training samples include at least one pair of words representing user events that appear within a predetermined number of temporally ordered user events in the query sessions and the negative training samples include pairs of words that are randomly selected from the query sessions, reducing a number of parameters of the query/ads model by removing v vectors for the query, the one or more advertisements, and the hyperlinks to improve efficiency in training the query/ads model; and generating, for each of the query, the one or more advertisements, and the hyperlinks in the training data, a vector by:

identifying a plurality of subwords in the query, advertisement, or hyperlink, and reducing a dimension for the vector by combining, via one of a convolutional neural network (CNN) and a recurrent neural network (RNN), a plurality of subword u vectors for the plurality of subwords to generate the vector for the query, the advertisement, or the hyperlink; and a query/ads model optimization engine implemented by the processor and configured for training, via machine learning, the query/ads model, by optimizing the parameters of the query/ads model through maximizing a modeled probability with respect to the positive training samples and minimizing the modeled probability with respect to the negative training samples.

10. The system of claim 9, wherein the combining is further via one of:

one that performs component-wise averaging; or one that performs component-wise average with average of pair wise component-wise product.

11. The system of claim 9, further comprising the query/ads model based ad selector implemented by the processor and configured for:

receiving the future query and a plurality of candidate advertisements identified based on the query;

identifying a set of subwords from the future query;

retrieving, from the query/ads model, vectors for the set of subwords and vectors for the plurality of candidate advertisements; and selecting, from the plurality of candidate advertisements, at least one selected advertisement for the query based on the vectors for the set of subwords and the vectors for the plurality of candidate advertisements, wherein the step of selecting is performed further based on a vector of the query obtained based on the vectors for the set of subwords of the query.

* * * * *